(12) United States Patent
Ramachandran et al.

(10) Patent No.: US 11,049,023 B1
(45) Date of Patent: Jun. 29, 2021

(54) METHODS AND SYSTEMS FOR EVALUATING AND IMPROVING THE CONTENT OF A KNOWLEDGE DATASTORE

(71) Applicant: MOVEWORKS, INC., Mountain View, CA (US)

(72) Inventors: Mukund Ramachandran, Sunnyvale, CA (US); Nishit Asnani, Sunnyvale, CA (US)

(73) Assignee: MOVEWORKS, INC., Mountain View, CA (US)

( * ) Notice: Subject to any disclaimer, the term of this patent is extended or adjusted under 35 U.S.C. 154(b) by 0 days.

(21) Appl. No.: 17/115,014

(22) Filed: Dec. 8, 2020

(51) Int. Cl.
| | |
|---|---|
| *G06N 5/02* | (2006.01) |
| *G06F 40/30* | (2020.01) |
| *G06F 40/205* | (2020.01) |
| *G06N 5/04* | (2006.01) |

(52) U.S. Cl.
CPC .......... *G06N 5/022* (2013.01); *G06F 40/205* (2020.01); *G06F 40/30* (2020.01); *G06N 5/04* (2013.01)

(58) Field of Classification Search
CPC ........ G06N 5/022; G06F 40/30; G06F 40/205
See application file for complete search history.

(56) References Cited

U.S. PATENT DOCUMENTS

| | | |
|---|---|---|
| 6,266,683 B1 | 7/2001 | Yehuda et al. |
| 7,007,232 B1 | 2/2006 | Ross et al. |
| 7,970,647 B2 | 6/2011 | Koeppel et al. |
| 8,032,480 B2 | 10/2011 | Pinckney et al. |
| 8,745,067 B2 | 6/2014 | Cierniak et al. |

(Continued)

FOREIGN PATENT DOCUMENTS

WO 2009/076555 A2 6/2009

OTHER PUBLICATIONS

"A Comprehensive Guide to User Feedback: User Feedback Tools, Questions, and Best Practices", ProProfs Qualaroo, downloaded Dec. 3, 2019 from: https://qualaroo.com/user-feedback/guide/, 18 pgs.

(Continued)

*Primary Examiner* — Luis A Sitiriche
*Assistant Examiner* — Casey R. Garner
(74) *Attorney, Agent, or Firm* — Ascenda Law Group, PC

(57) ABSTRACT

The content of a knowledge datastore is evaluated and improved. In a first aspect, the content effectiveness of individual snippets is evaluated and a content creator is requested to improve snippets with a low content effectiveness. In a second aspect, the supply of and demand for content in each content topic is evaluated, and a content creator is requested to create articles for content topics for which the demand exceeds the supply. In a third aspect, the message responsiveness and content effectiveness of content topics is evaluated and a content creator is requested to create articles for content topics with a low message responsiveness and/or content effectiveness. In a fourth aspect, the content utilization and content effectiveness of individual snippets is monitored and snippets with a high content effectiveness and a low content utilization are promoted, whereas snippets with a low content effectiveness and a low content utilization are deprecated.

20 Claims, 23 Drawing Sheets

(56) References Cited

U.S. PATENT DOCUMENTS

| | | | |
|---|---|---|---|
| 9,002,858 B1* | 4/2015 | Dassa | G06Q 30/0202 |
| | | | 707/750 |
| 9,218,344 B2 | 12/2015 | Al-Kofahi et al. | |
| 9,553,902 B1 | 1/2017 | Cherukuri et al. | |
| 10,354,257 B2 | 7/2019 | Walthers et al. | |
| 10,417,644 B2 | 9/2019 | Walthers et al. | |
| 10,685,359 B2 | 6/2020 | Walthers et al. | |
| 2009/0222551 A1* | 9/2009 | Neely | G06F 16/951 |
| | | | 709/224 |
| 2011/0252108 A1 | 10/2011 | Morris et al. | |
| 2015/0006237 A1 | 1/2015 | Beck et al. | |
| 2015/0039419 A1* | 2/2015 | Dixit | G06Q 30/0247 |
| | | | 705/14.46 |
| 2015/0213119 A1* | 7/2015 | Agarwal | G06Q 50/01 |
| | | | 707/737 |
| 2018/0077088 A1* | 3/2018 | Cabrera-Cordon | G06N 3/006 |
| 2018/0246983 A1* | 8/2018 | Rathod | G06F 16/9535 |
| 2018/0322508 A1 | 11/2018 | Walthers et al. | |
| 2019/0317955 A1 | 10/2019 | Zhelezniak et al. | |
| 2019/0325323 A1 | 10/2019 | Walthers et al. | |

OTHER PUBLICATIONS

Ahern, Pat, "How to Find and Fill a Content Gap for SEO and UX", Content Marketing Institute, Apr. 4, 2019, downloaded from: https://contentmarketinginstitute.com/2019/04/content-gap-seo-ux/, 22 pgs.

Davydoff, Daniil ,"How to Balance Supply and Demand within Corporate Intelligence Programs", Security Magazine, Aug. 14, 2019, downloaded from: https://www.securitymagazine.com/articles/90719-how-to-balance-supply-and-demand-within-corporate-intelligence-programs, 5 pgs.

Denker; et al., "Assessing the Fitness of Information Supply and Demand during User Interface Design", Proceedings of the 5th International Conference on Applied Human Factors and Ergonomics AHFE 2014, Kraków, Poland Jul. 19-23, 2014, pp. 521-530.

Goodwin, Danny, "How & Why You Must Improve or Remove Your Old Content", Search Engine Journal, Apr. 1, 2019, downloaded from: https://www.searchenginejournal.com/improve-remove-old-content/300961/, 27 pgs.

Puri, Ritika, "Why You Need a Content Gap Analysis and How to Do It Right" , upland Kapost, Apr. 27, 2015, downloaded from: https://uplandsoftware.com/kapost/resources/blog/find-content-gaps/ , 7 pgs.

Sizemore, Everett, "How to Do a Content Audit [Updated for 2017]", Moz, Mar. 22, 2017, downloaded from: https://moz.com/blog/content-audit, 37 pgs.

Vonk; et al., "Improving the Adoption and Use of Planning Support Systems in Practice", Applied Spatial Analysis and Policy (2008), 1:153-173.

Wagaba, Mike, "A Comprehensive Guide to Content Gap Analysis", Medium, Oct. 1, 2018, downloaded from: https://medium.com/analytics-for-humans/a-comprehensive-guide-to-content-gap-analysis-f795a18ea670, 12 pgs.

\* cited by examiner

| Snippet | # of times snippet was presented to users | # of times snippet was indicated to be helpful | # of times snippet was indicated to be unhelpful | # of times snippet was neither indicated to be helpful nor unhelpful | # of times a ticket was filed following presentation of the snippet | # of times link to full article was selected by a user | Content effectiveness of snippet |
|---|---|---|---|---|---|---|---|
| A | 346 | 20 | 300 | 26 | 35 | 10 | 0.13 |
| B | 80 | 40 | 2 | 38 | 0 | 13 | 0.97 |
| C | 73 | 33 | 5 | 35 | 3 | 101 | 0.93 |
| D | 211 | 87 | 35 | 89 | 10 | 54 | 0.83 |
| ... | ... | ... | ... | ... | ... | ... | ... |

Fig. 3C

| Snippet | # of users the snippet was presented to | # of users who indicated the snippet to be helpful | # of users who indicated the snippet to be unhelpful | # of users who neither indicated the snippet to be helpful or unhelpful | # of users who filed a ticket following presentation of the snippet | # of users who selected link to full article | Content effectiveness of snippet |
|---|---|---|---|---|---|---|---|
| A | 286 | 15 | 249 | 22 | 33 | 29 | 0.13 |
| B | 58 | 33 | 1 | 24 | 0 | 8 | 0.98 |
| C | 53 | 20 | 3 | 30 | 2 | 14 | 0.94 |
| D | 176 | 79 | 20 | 77 | 9 | 19 | 0.87 |
| ... | ... | ... | ... | ... | ... | ... | ... |

Bot 11:20 AM
Hi Bob, the following snippet of your article has a low content effectiveness score: — 340a

<Email application XYZ> not responding, freezes or ignores user commands:
There are many reasons why <email application XYZ> may behave this way.
1. A dialog window may be open. Check whether a...

— 304a
— 340b

You may want to edit the snippet, so that more users will find this snippet to be helpful. Let me know once you have made your changes.

Bob (Content Creator) 2:02 PM — 340c
Thanks for letting me know that the snippet needs improvement. It has been updated now. Hopefully, more users will find the snippet to be helpful now.

Bot 2:02 PM — 340d
Super! I will let you know in a few weeks whether your edits have made a positive impact on the readers.

Fig. 3G

Bot 1:20 PM
What do you think is causing the issue with the following message?

*The video quality of <XYZ video conference> is very poor, but the audio is fine. Do you know what's the likely issue?*

- Internet connectivity
- Video camera
- Lighting in the room
- Video conference software } Candidate symptoms

Frank (Human Agent) 1:21 PM
Internet connectivity

Bot 1:21 PM
Thanks, which business entity should the user contact to resolve the Internet connectivity issue?

[ <XYZ> ] [ <ABC> ] [ <123> ]

} Candidate entities

Frank (Human Agent) 1:22 PM
<ABC>

Bot 1:22 PM
Thanks!

504 Total number of messages received per content topic (Demand)

| Symptom | Entity | | | | | |
|---|---|---|---|---|---|---|
| | <ABC> | <DEF> | <MNO> | <XYZ> | <123> | ... |
| Slow Internet | 23 | 42 | 0 | 0 | 0 | |
| Login issue | 0 | 0 | 32 | 0 | 52 | |
| Email not sending | 44 | 70 | 81 | 44 | 0 | |
| No audio | 0 | 0 | 230 | 0 | 33 | |
| ... | | | | | | |

506 Total number of articles available per content topic (Supply)

| Symptom | Entity | | | | | |
|---|---|---|---|---|---|---|
| | <ABC> | <DEF> | <MNO> | <XYZ> | <123> | ... |
| Slow Internet | 3 | 1 | 0 | 0 | 0 | |
| Login issue | 0 | 0 | 2 | 2 | 3 | |
| Email not sending | 4 | 7 | 4 | 1 | 1 | |
| No audio | 0 | 0 | 6 | 0 | 0 | |
| ... | | | | | | |

Bot 3:20 PM
Hi Erin, there aren't many good articles that address the login issue for the <DEF entity>. Would you mind writing an article that we can add to the repository? — 724a

Erin (Content Creator) 3:22 PM — 724b
Sure. Give me a day, and I'll have it ready.

Bot 3:22 PM — 724c
Thanks!

Erin (Content Creator) 10:04 AM — 724d
I just uploaded an article that addresses the login issue for the <DEF entity>. Hopefully, people will find it to be helpful.

Bot 10:04 AM — 724e
Super! I'm sure it will help. Thanks!

METHODS AND SYSTEMS FOR EVALUATING AND IMPROVING THE CONTENT OF A KNOWLEDGE DATASTORE

FIELD OF THE INVENTION

The present invention relates to methods for evaluating and improving the content of a knowledge datastore, and more particularly relates to evaluating the content effectiveness and content utilization of snippets as well as the message responsiveness and content effectiveness of content topics.

BACKGROUND

Automated agents allow users to submit natural language queries or requests which, in turn, may be addressed by content stored in a knowledge datastore. The usefulness of an automated agent, however, is limited if the content in the knowledge datastore is of low quality (e.g., written in an unclear manner, is out of date, etc.). Disclosed herein are processes to evaluate and improve the content stored in a knowledge datastore so as to improve the overall experience of users with automated agents.

SUMMARY OF THE INVENTION

In accordance with one embodiment of the invention, the content of a knowledge datastore is evaluated and improved. In a first aspect, the content effectiveness of individual article snippets (hereinafter, "snippets") is evaluated, and a content creator may be requested to improve snippets with a low content effectiveness. In one embodiment, the content effectiveness of a snippet may be computed as one minus the total number of times the snippet was rated as unhelpful divided by the total number of times the snippet was presented. In another embodiment, the content effectiveness of a snippet may be computed as one minus the total number of users who indicated the snippet to be unhelpful divided by the total number of users the snippet was presented to. The content creator may be asked to include additional details into the snippet, improve the clarity of the snippet, add one or more citations to the snippet, and/or modify a verbosity of the snippet.

In a second aspect, the supply of and demand for content in each content topic is evaluated, and a content creator is requested to create articles for content topics for which the supply is insufficient relative to the demand. The supply of content for a content topic may be estimated based on the number of articles available for that content topic. The demand for a content topic may be estimated based on the number of messages (e.g., requests, queries, etc.) received for the content topic in a certain time period.

In a third aspect, the message responsiveness and content effectiveness of respective content topics is evaluated, and a content creator is requested to create articles for content topics with a low message responsiveness and/or content effectiveness. The message responsiveness of a content topic may be evaluated as the fraction of messages received for the content topic for which at least one snippet was presented. The content effectiveness of a content topic may be evaluated as one minus the number of times snippets in the content topic were rated as unhelpful divided by the number of times snippets in the content topic were presented.

In a fourth aspect, the content utilization and content effectiveness of individual snippets is monitored. For snippets with a high content utilization and high content effectiveness, the frequency at which those snippets is presented is unchanged. For snippets with a high content effectiveness and a low content utilization, the frequency at which those snippets is presented is increased (i.e., also called content promotion). For snippets with a low content effectiveness and a low content utilization, those snippets are removed from an index so that they are no longer presented (i.e., also called content deprecation).

These and other embodiments of the invention are more fully described in association with the drawings below.

BRIEF DESCRIPTION OF THE DRAWINGS

FIG. 3C depicts a table with the content effectiveness of a plurality of snippets, as well as various metrics that may be used to compute the content effectiveness, in accordance with one embodiment of the invention.

FIG. 3E depicts a table with the content effectiveness of a plurality of snippets, as well as various metrics (different from those included in FIG. 3C) that may be used to compute the content effectiveness, in accordance with one embodiment of the invention.

FIG. 3G depicts an example conversation between an automated agent and a content creator, in which the content creator is requested to improve a snippet of an article, in accordance with one embodiment of the invention.

FIG. 5B depicts an example conversation between an automated agent and a human agent, in which the human agent assists the automated agent to identify the content topic associated with a message, in accordance with one embodiment of the invention.

FIG. 5C depicts two tables, the upper table tabulating the demand for a plurality of content topics, and the bottom table tabulating the supply of articles for each of the content topics, in accordance with one embodiment of the invention.

FIG. 7E depicts an example conversation between an automated agent and a content creator, in which the automated agent requests the content creator to create an article for a content topic with a low content effectiveness, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/ steps.

Figure 1:
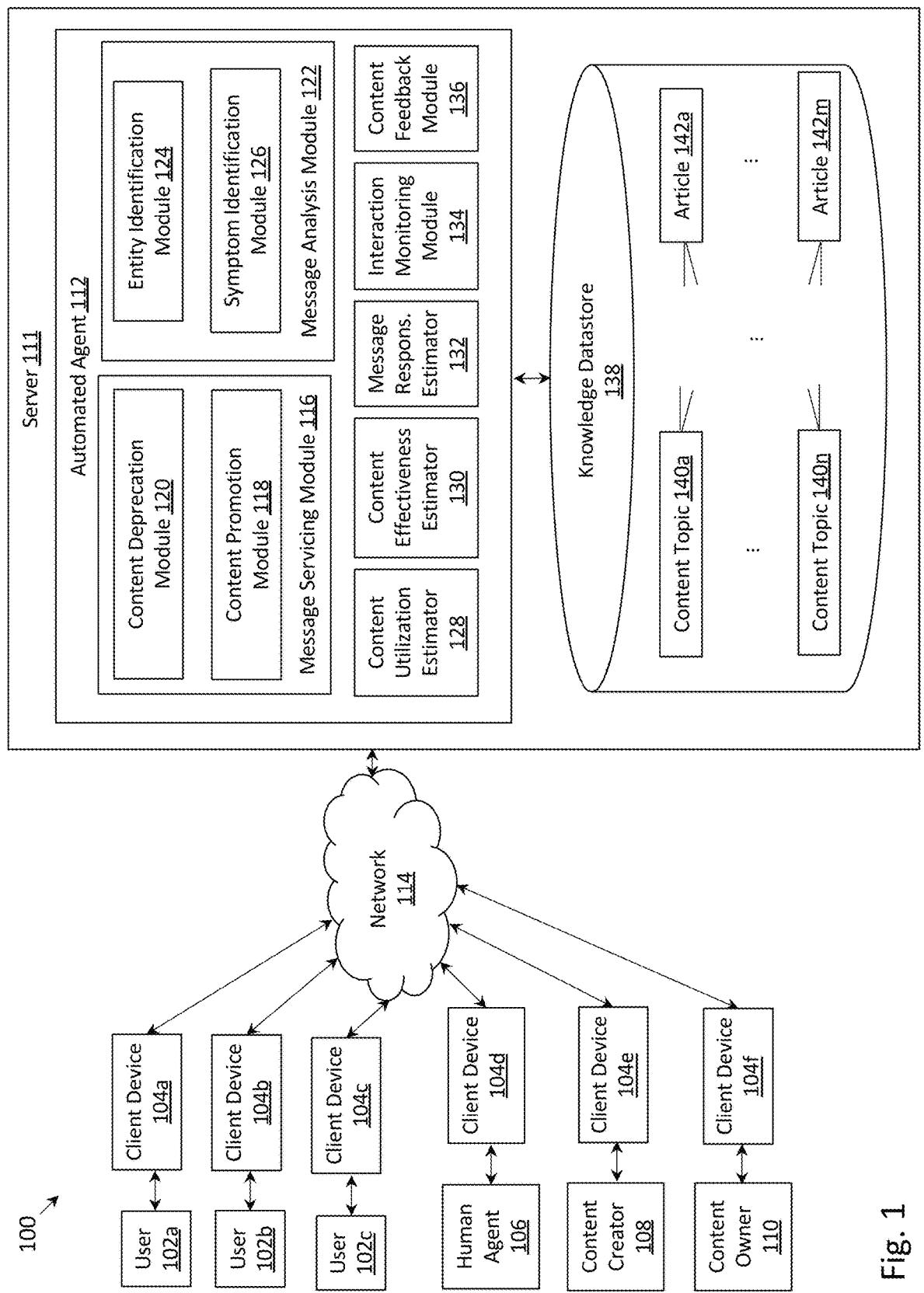
FIG. 1 depicts a system diagram with a plurality of client devices communicatively coupled to an automated agent instantiated on a server, in accordance with one embodiment of the invention.

FIG. 1 depicts system diagram 100 with a plurality of client devices 104a-104f communicatively coupled to server 111 via network 114. Network 114 may be any form of communications means and, in some cases, may be individual communications links, or one or more communications networks, including private networks, public networks, and/or virtual private networks over public networks.

User 102a may use client device 104a to transmit a message to automated agent 112 (e.g., bot, chatbot) instantiated on server 111. The message may include a request (e.g., "I would like login credentials for <application ABC>", a query (e.g., "How do I get login credentials for <application ABC>?") or may state a problem (e.g., "I can't login to <application ABC>"). In response to the user message, message servicing module 116 of automated agent 112 may determine an intent of the user message, and then attempt to return one or more snippets from articles 142a-142m (stored in knowledge datastore 138) that are relevant to the determined intent.

A snippet generally refers to any portion of an article that is less than an entirety of the article. For example, the portion may start from a heading (e.g., html heading, wiki heading, etc.) contained in the article and contain a few sentences and/or phrases following the heading. If an article includes images (or other graphics), the snippet may also include one or more images (or other graphics) from the article. In most cases, the snippet is presented to the user with a full article link which, when selected by the user, causes the display of the full article that contains the snippet.

In some instances, the returned snippet may contain information that adequately addresses the request, query and/or problem described in the user message, and user 102a may have a positive experience with automated agent 112. However, in other instances, the returned snippet may contain information that is not directly on point and leave user 102a feeling dissatisfied. There may be two primary reasons why a returned snippet may be less than satisfactory. First, the content in knowledge datastore 138 may be deficient. In other words, even if a search algorithm were to locate the best snippet from the best article in knowledge datastore 138, that snippet does not address the user message in a satisfactory manner.

The content in knowledge datastore 138 may be improved in accordance with the following approaches. First, at a granular level, individual snippets may be evaluated in accordance with a content effectiveness metric and snippets with a content effectiveness below a threshold may be sent to a content creator for revision. More specifically, interaction monitoring module 134 may monitor the interaction of users (e.g., users 102a-102c) with an individual snippet. The monitored interaction may include an indication of the snippet being helpful, an indication of the snippet being unhelpful or no indication as to whether the snippet was helpful or unhelpful. The monitored interaction may also include a user filing an IT ticket in response to the snippet failing to address his/her message. The monitored interaction may also include a user selecting a link to view the full article within which the snippet is contained. Such monitored interaction with an individual snippet may be used by content effectiveness estimator 130 to compute a content effectiveness of the snippet. In one embodiment, the content effectiveness is computed as one minus the number of times a snippet was indicated as being unhelpful divided by the total number of times the snippet was presented. For snippets with a content effectiveness below a threshold, content feedback module 136 of automated agent 112 may reach out to content creator 108 who created the snippet, and ask the content creator to improve one or more aspects of the snippet. For example, the content creator may be asked to include additional details into the snippet, improve a clarity of the snippet, add one or more citations to the snippet, and/or modify a verbosity of the snippet.

Second, at a coarser level, the content within content topics 140*a*-140*n* may be improved by first evaluating the content within the individual content topics in accordance with the characteristics of supply/demand, message responsiveness and content effectiveness. In one embodiment of the invention, content topics may be characterized by the pairing of an entity with a symptom. An entity may be a business entity, a software application or a hardware component, and a symptom may be a specific issue or problem associated with the entity. To allow for the analysis of content topics, messages may be first classified into one or more content topics by entity identification module 124 and symptom identification module 126 of message analysis module 122. The classification of messages allows the statistics associated with the messages (and any snippets returned in response) to be aggregated at the level of content topics.

For example, to monitor the balance of supply and demand of a content topic, messages are first classified into various content topics. The demand for a content topic may be estimated as the number of messages received within a time period for that content topic. The supply of a content topic may be determined based on the number of articles that are available for that content topic. If the demand for a content topic exceeds the supply of the content topic by a certain margin (e.g., exceed by 20%, 30%, 40%, etc.), content feedback module 136 of automated agent 112 may reach out to content creator 108, and ask the content creator to create or share some articles for that content topic.

To monitor the message responsiveness of a content topic, messages are again first classified into various content topics. For messages that are classified into a certain content topic, message responsive estimator 132 may analyze the fraction of those message for which at least one snippet was returned. This fraction is known as the message responsiveness of the content topic. If a content topic has a low message responsiveness (e.g., below 10%, 20%, 30%, etc.) content feedback module 136 of automated agent 112 may request content creator 108 to create one or more articles to address the messages received in that content topic for which no snippet was provided.

To monitor the content effectiveness of a content topic, messages are again first classified into various content topics. For messages that are classified into a certain content topic, interaction monitoring module 134 may analyze the interaction of users with the snippets that are returned for those message. As described above, the interaction may include an indication of a snippet being helpful or unhelpful, or no indication of whether the snippet was helpful or unhelpful. Content effectiveness estimator 130 may determine the content effectiveness of a content topic based on such monitored interactions. Whereas the monitored interactions for a single snippet may be analyzed to arrive at the content effectiveness of a single snippet, the monitored interactions of a group of snippets associated with a content topic may be analyzed to arrive at the content effectiveness of a content topic. If a content topic has a low content effectiveness (e.g., below 10%, 20%, 30%, etc.), content feedback module 136 of automated agent 112 may request content creator 108 to create one or more articles to address that content topic.

Another reason why a snippet that is less than satisfactory is returned is that the search algorithm used by message servicing module 116 may have difficulty locating the relevant snippets. In other words, relevant snippets exist, but message servicing module 116 may inadvertently present a snippet that is less than satisfactory. Content deprecation module 120 addresses this problem by removing snippets with a low content score from an index to reduce the chances for low quality snippets to be presented. More specifically, the content score of a snippet may be computed as a function (e.g., product) of the content utilization of the snippet, as determined by content utilization estimator 128, and the content effectiveness of the snippet, as determined by content effectiveness estimator 130. The content utilization of a snippet may be computed as the number of times the snippet was presented for a certain content topic (in a certain time period) divided by the number of messages received for the content topic (in the same time period). As such, the computation of the content utilization also requires messages to be classified into a content topic, similar to the discussion above. One example of the computation of the content effectiveness of a snippet was previously provided.

To further assist message servicing module 116, content promotion module 118 may identify the "hidden gems" (i.e., articles with a high content effectiveness score and a low content utilization). In other words, there may be articles with relevant content, but these articles are underutilized. The goal of content promotion module 118 is to "promote" (i.e., present with a higher frequency) the hidden gems so that more users may benefit from the information contained therein. While it is contemplated that the promotion and deprecation of content may be performed automatically, it is also contemplated that automated agent 112 may contact content owner 110 of the snippet and provide the content owner with a recommendation to promote or deprecate the content. Upon receiving the authorization of the content owner, a snippet may be promoted or deprecated.

Figure 2:
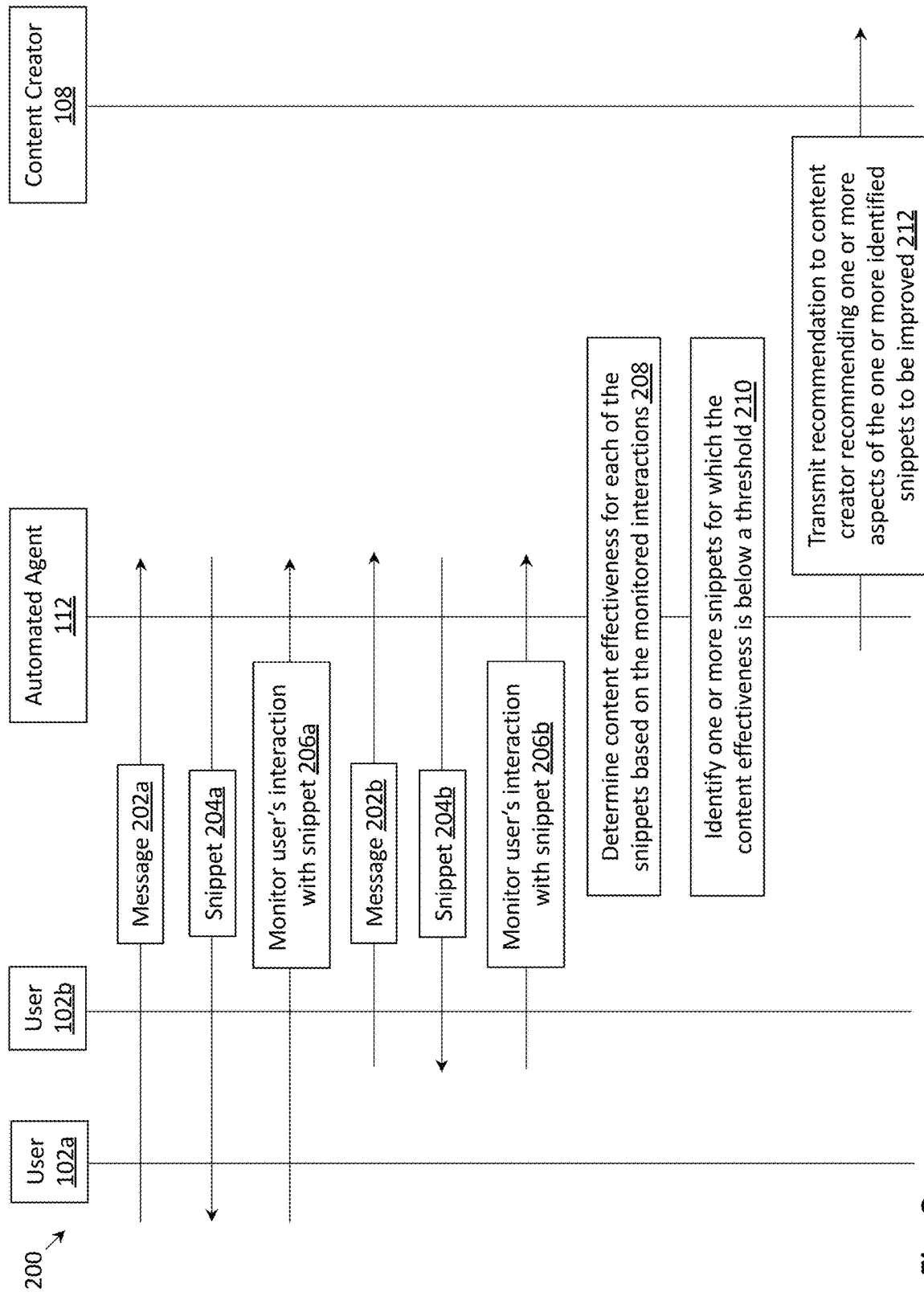
FIG. 2 depicts a sequence diagram of a process for identifying snippets with a low content effectiveness and recommending a content creator to improve the identified snippets, in accordance with one embodiment of the invention.

FIG. 2 depicts sequence diagram 200 of a process for identifying snippets with a low content effectiveness and recommending a content creator to improve the identified snippets. At step 202*a*, a message may be received by automated agent 112 from user 102*a*. As described above, such message may include a request, include a query, or describe a problem. At step 204*a*, automated agent 112 may transmit one or more snippets to user 102*a* to address the message. At step 206*a*, automated agent 112 may monitor the interaction of user 102*a* with the snippet. Similarly, at step 202*b*, a message may be received by automated agent 112 from user 102*b*. At step 204*b*, automated agent 112 may transmit one or more snippets to user 102*b* to address the message. At step 206*b*, automated agent 112 may monitor the interaction of user 102*b* with the snippet. It is understood that many additional messages may be received from a plurality of users and processed in a similar fashion to that described in steps 202*a/b*, 204*a/b*, 206*a/b* before the process continues to step 208.

At step 208, automated agent 112 may determine a content effectiveness for each of the snippets based on the monitored interactions. As previously described, monitored interactions may include an indication that a snippet was helpful, an indication that the snippet was unhelpful, or no indication as to whether the snippet was helpful or unhelpful. The monitored interaction may also include a user filing an IT ticket in response to failure of the snippet to address his/her message. The monitored interaction may also include a user selecting a link to view the full article within which the snippet is contained. In one embodiment, the content effectiveness is computed as one minus the number of times a snippet was indicated as being unhelpful divided by the total number of times the snippet was presented.

At step 210, automated agent 112 may identify one or more snippets for which the content effectiveness is below a threshold. The threshold may be a set value for all snippets (e.g., 90%) or may be individually set for each snippet. For instance, a snippet that has a high content utilization might have a higher content effectiveness threshold (e.g., as a matter of allocating resources, a content creator's time may be best spent revising snippets that are presented more frequently). As another example, the content effectiveness threshold may be independently set for each content topic. For instance, the threshold for a content topic that is used by a large number of users could be set higher than a content topic that is used by a fewer number of users.

At step 212, automated agent 112 may transmit a recommendation (or request) to content creator 108, recommending (or requesting) the content creator to improve one or more aspects of the one or more identified snippets. If any users have provided more detailed comments (e.g., this snippet contains outdated information, this snippet contains incorrect information, this snippet contains contradictory information, etc.), those comments can be communicated to the content creator as well.

FIGS. 3A-3G provide examples to illustrate sequence diagram 200 of FIG. 2.

Figure 3A:
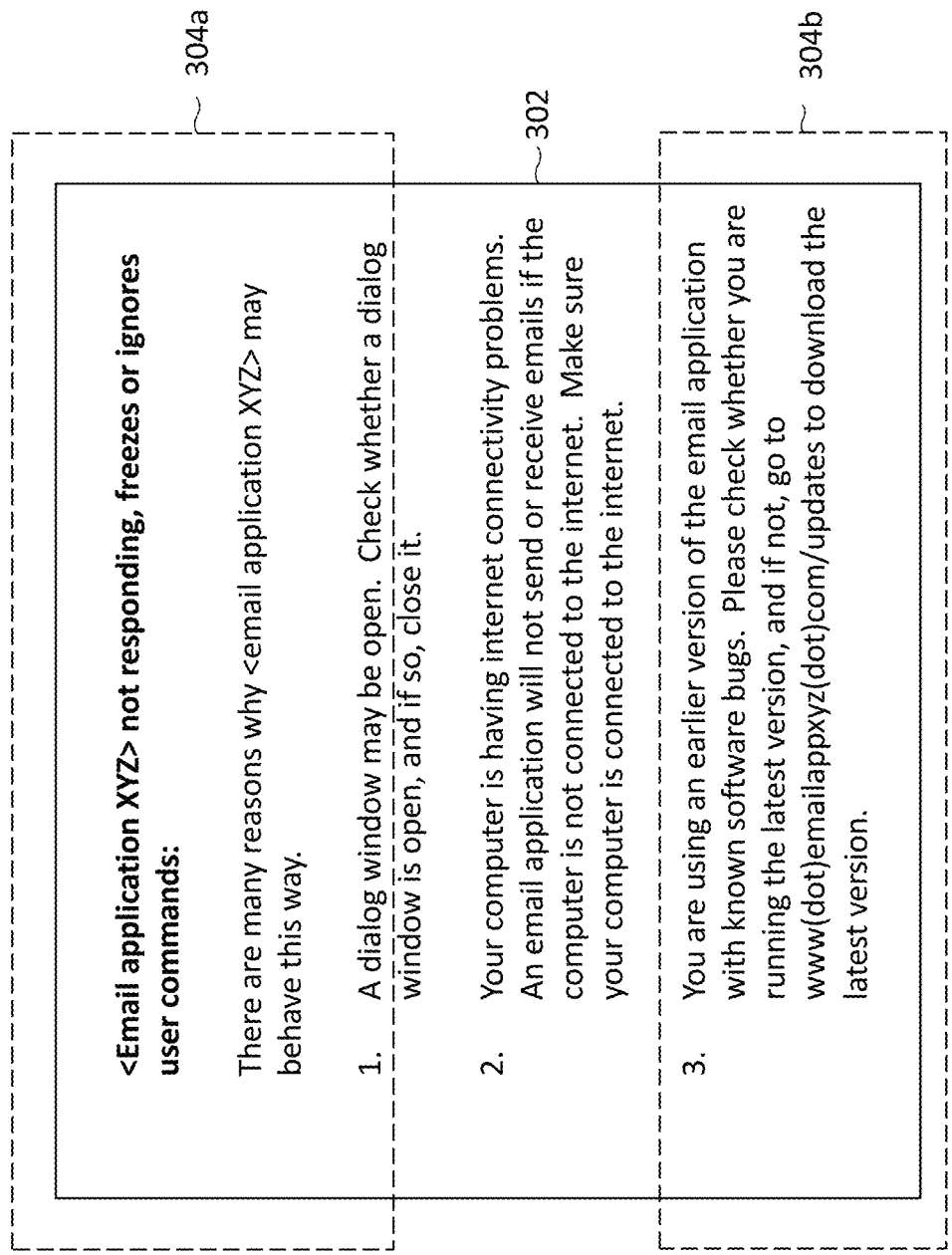
FIG. 3A depicts an example of an article and snippets of the article, in accordance with one embodiment of the invention.

FIG. 3A depicts an example article 302 and two example snippets 304a and 304b from the article. Snippets 304a and 304b may also be referred to as snippets A and B, respectively. In the example of FIG. 3A, the snippets are non-overlapping (i.e., do not share the same text). However, it is possible in other embodiments for snippets to be overlapping. Also, in the example of FIG. 3A, each snippet contained contiguous text of the article. However, it is possible in other embodiments for a snippet to contain non-contiguous text (such as would be the case if snippets 304a and 304b were part of one snippet).

Figure 3B:
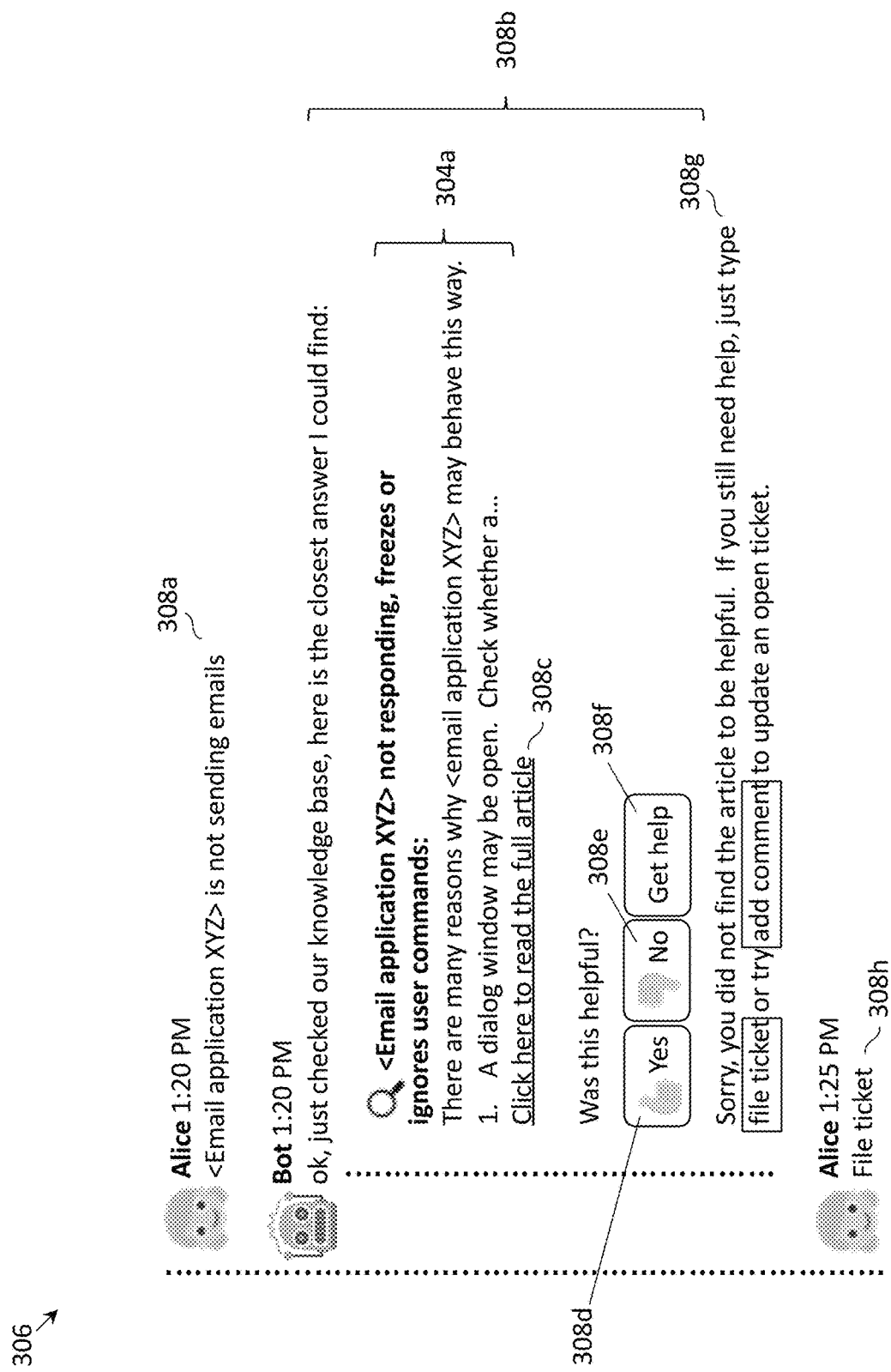
FIG. 3B depicts an example conversation between a user and an automated agent, in which a message of the user is addressed by a snippet of an article, and the user provides feedback on the helpfulness of the snippet, in accordance with one embodiment of the invention.

FIG. 3B depicts an example conversation 306 between a user (Alice) and automated agent (bot), in which the bot addresses a message of Alice with a snippet of an article, and Alice provides feedback on the helpfulness of the snippet. The conversation begins with Alice transmitting message 308a, which reads "<Email application XYZ> is not sending emails." It is understood that <Email application XYZ> is a placeholder for an email application, and the actual message of Alice would contain a name of an email application instead of this placeholder. Next, the bot replies with message 308b, "ok just checked our knowledge base, here is the closest answer I could find:" Message 308b may also include snippet 304a, a link 308c to article 302, selectable button "Yes" 308d for a user to provide an indication that the snippet was helpful, selectable button "No" 308e for the user to provide an indication that the snippet was unhelpful, and selectable button "Get help" 308f for the user to request additional assistance from the bot. In this particular example, Alice selects the "No" button 308e. Although no indication of the selection of the "No" button 308e is shown in FIG. 3B, it is understood that such indication is received by the bot. The bot then responds with message 308g, "Sorry, you did not find the article to be helpful. If you still need help, just type [file ticket] or try [add comment] to update an open ticket." Alice then responds with message 308h, "File ticket". It is noted that other types of feedback may be requested by the bot, such as whether the snippet was relevant, whether the snippet was long enough, whether the snippet was clearly written, etc. Thus, FIG. 3B illustrates steps 202a, 204a and 206a of FIG. 2, as well as includes steps that are not shown in FIG. 2 (such as messages 308g and 308h).

FIG. 3C depicts table 310 containing the content effectiveness of snippets A, B, C and D (presented in column 8), as well as various metrics that may be used to compute the content effectiveness (presented in columns 2-7). Colum 2 tabulates the number of times a snippet was presented to users. In the example of table 310, it is assumed that a snippet being presented to a user twice (e.g., snippet A is presented to a user in the morning, and the same snippet is presented to the user in the evening) is counted as two separate presentations of snippet A. Column 3 tabulates the number of times a snippet was indicated to be helpful. For the sake of record keeping, each user will only be given a single "vote" (or opportunity to rate the snippet) each time a snippet is presented. In other words, if a user selects the selectable button "Yes" 308d twice, after receiving snippet 304a, the "helpful" metric would only increase by "1". However, it is contemplated that a user could be presented the same snippet multiple times (e.g., presented snippet 304a once in the morning at once at night). In this scenario, one user could cast multiple votes (e.g., once in the morning and once at night).

Column 4 tabulates the number of times a snippet was indicated to be unhelpful. In other words, such metric counts the number of times selectable button 308e was selected. Column 5 tabulates the number of times a snippet was neither indicated to be helpful or unhelpful. In other words, such metric counts the number of times a snippet was presented but neither selectable button 308d or 308e was selected. Column 6 tabulates the number of times a ticket was filed following the presentation of a snippet. In the example of FIG. 3B, message 308h would be counted as the filing of one ticket. Column 7 tabulates the number of times a link to a full article (also called "full article link") was selected by a user.

In table 310, the content effectiveness of a snippet is calculated as one minus the number of times the snippet was indicated to be unhelpful divided by the number of times the snippet was presented to users. As an example, for snippet A, the content effectiveness was calculated as 1−300/346.

Figure 3D:
FIG. 3D depicts a graphic that illustrates the relationship between various metrics from FIG. 3C that may be used to compute the content effectiveness, in accordance with one embodiment of the invention.

FIG. 3D depicts graphic 312 that illustrates the relationship between various metrics presented in FIG. 3C. As visually shown in FIG. 3D, the total number of times a snippet was indicated to be helpful (314), the total number of times a snippet was indicated to be unhelpful (316), and the total number of times a snippet was neither indicated to be helpful nor unhelpful may sum to the number of times a snippet was presented to the users (322). Therefore, in the formulation of the content effectiveness calculated as one minus the number of times the snippet was indicated to be unhelpful divided by the number of times the snippet was presented to users, the simplification was made that the users who did not provide any feedback had a satisfactory experience. This, however, may be an overly optimistic simplification, as in reality, some users who are not satisfied may forego providing any feedback. To account for these "silent unsatisfied users", the computation of the content effectiveness may be refined as follows:

$$1 - \frac{316 + \alpha(320)}{322}$$

where $\alpha$ is equal to a small fraction, such as 0.1, and the reference numerals of FIG. 3D have been used in the equation for simplicity of notation. In other words, the content effectiveness has been refined to account for a small portion of the users who provided no feedback as having an unsatisfactory experience.

Also as shown in graphic 312, it is possible for a ticket to be filed after a user indicates the snippet to be unhelpful (such instances counted in 318a), and it is also possible for a ticket to be filed after a user provides no feedback as to whether the snippet was helpful or unhelpful (such instances counted in 318b). 318a and 318b sum to the total number of times a ticket was filed in response to the presentation of the snippet (318). For simplicity, an assumption is made in FIG. 3D that if a user indicates a snippet to be helpful, that snippet is sufficient to address the user's needs and the user does not subsequently file a ticket. Based on such logical relationships, the computation of the content effectiveness may be further refined as follows:

$$1 - \frac{316 + 318b + \alpha(320 - 318b)}{322}$$

Essentially, such refinement gives an equal weighting to 318b and 316. Regardless of whether (i) a user indicated a snippet to be unhelpful, (ii) a user indicated a snippet to be unhelpful and filed a ticket or (iii) a user provided no indication of whether the snippet was helpful/unhelpful, but filed a ticket, each of these scenarios would be counted as one "negative" vote. The "silent unsatisfied users" are also accounted for in the expression that involves the multiplication of $\alpha$.

FIG. 3E depicts table 324 with the content effectiveness of snippets A, B, C and D (in column 8) that have been computed using metrics (in columns 2-7) that are formulated slightly differently than the metrics presented in table 310. In the record keeping followed in table 324, each user is only given a single opportunity to rate the snippet (i.e., one vote per snippet). Therefore, if a user were to give positive feedback for the snippet in the morning, followed by a negative feedback for the snippet in the evening, only one of the "votes" would be counted. In one embodiment, only the most recent vote of a user would be counted. Based on such record keeping, the metrics (in columns 2-7) keep track of the number of unique users (e.g., based on a unique MAC address, login ID, etc.) whose actions fit within the description of each of the metrics. Column 2 tabulates the number of (unique) users the snippet was presented to; column 3 tabulates the number of (unique) users who indicated the snippet to be hopeful; column 4 tabulates the number of (unique) users who indicated the snippet to be unhelpful; column 5 tabulates the number of (unique) users who neither indicated the snippet to be helpful or unhelpful; column 6 tabulates the number of (unique) users who filed a ticket following the presentation of the snippet; and column 7 tabulates the number of (unique) users who selected the link to the full article. The content effectiveness (column 8) may be computed in FIG. 3E as one minus the total number of users who found the snippet to be unhelpful divided by the total number of users the snippet was presented to. As an example, for snippet A, the content effectiveness was calculated as 1-249/286.

Figure 3F:
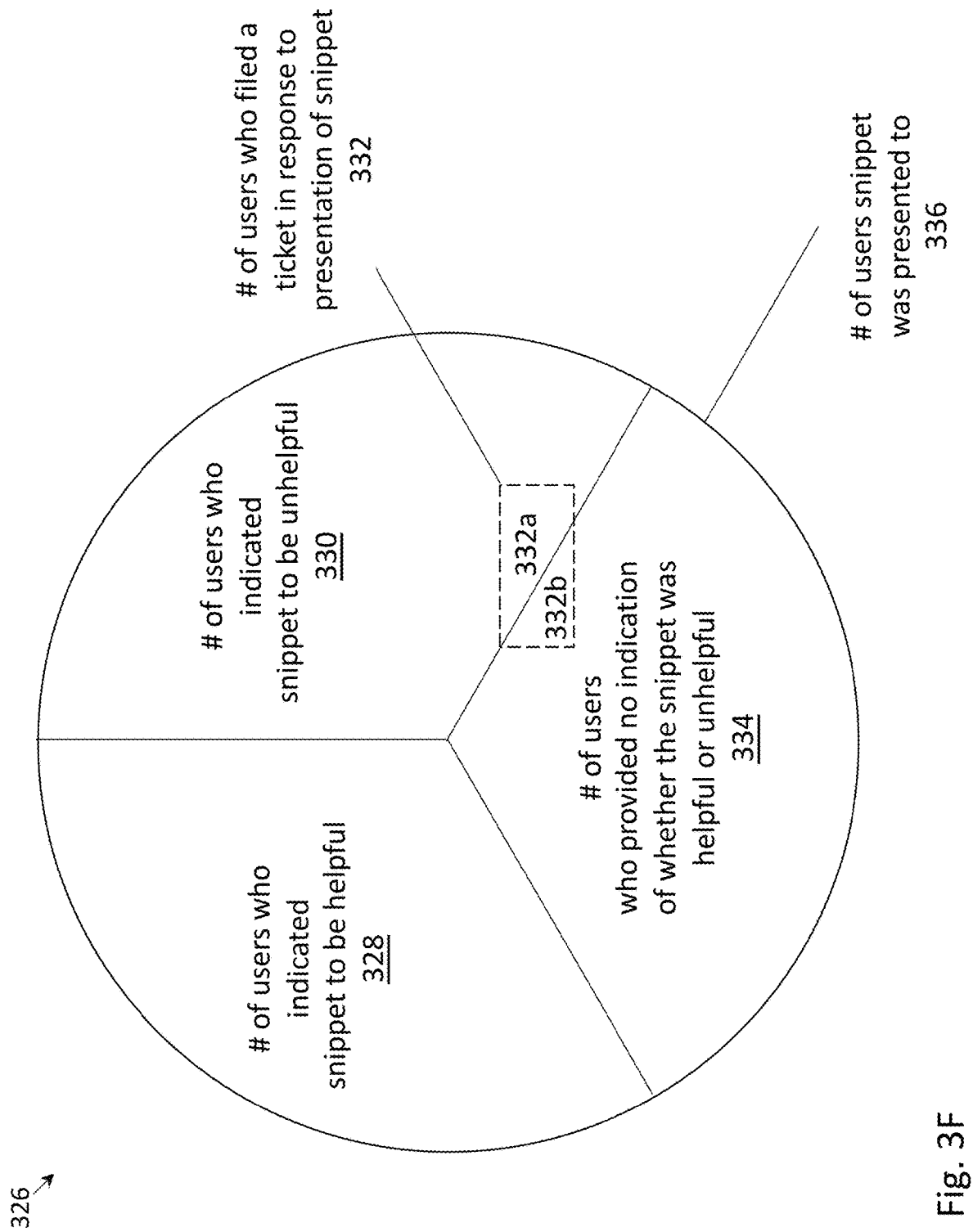
FIG. 3F depicts a graphic that illustrates the relationship between various metrics from FIG. 3E that may be used to compute the content effectiveness, in accordance with one embodiment of the invention.

FIG. 3F depicts graphic 326 that illustrates the relationship between various metrics from FIG. 3E. As visually shown in FIG. 3F, the total number of users who indicated the snippet to be helpful (328), the total number of users who indicated the snippet to be unhelpful (330), and the total number of users who provided no indication of whether the snippet was helpful or unhelpful (334) may sum to the total number of users the snippet was presented to (336). The content effectiveness computation of column 8 of table 324 may be expressed as follows using the reference numbers of graphic 326:

$$1 - \frac{330}{336}$$

As described above, such formulation may be an overly optimistic simplification, as in reality, some users who are not satisfied may forego providing any feedback. To account for these "silent unsatisfied users", the computation of the content effectiveness may similarly be refined as follows:

$$1 - \frac{330 + \alpha(334)}{336}$$

where $\alpha$ is equal to a small fraction, such as 0.1.

Also as shown in graphic 326, it is possible for a ticket to be filed after a user indicates a snippet to be unhelpful (such instances counted in 332a), and it is also possible for a ticket to be filed after a user provides no feedback as to whether the snippet was helpful or unhelpful (such instances counted in 332b). 332a and 332b sum to the total number of users who filed a ticket in response to presentation of the snippet (332). Based on such logical relationships, the computation of the content effectiveness may be further refined as follows:

$$1 - \frac{330 + 332b + \alpha(334 - 332b)}{336}$$

As mentioned above, such refinement gives an equal weighting to 330 and 332b. Regardless of whether (i) a user indicated a snippet to be unhelpful, (ii) a user indicated a snippet to be unhelpful and filed a ticket or (iii) a user provided no indication of whether the snippet was helpful/unhelpful, but filed a ticket, each of these scenarios would be counted as one "negative" vote.

To summarize, FIGS. 3C and 3E as well as the associated description have presented numerous examples of step 208 of FIG. 2 (i.e., determine content effectiveness for each of the snippets based on the monitored interactions). To continue with the example, suppose the content effectiveness threshold were equal to 0.75. To illustrate step 210, snippet A would be identified as a snippet with a content effectiveness below the threshold (i.e., in either table 310 or 324, the content effectiveness of snippet A is less than 0.75).

FIG. 3G depicts conversation 338 between automated agent 112 (*bot*) and content creator 108 (Bob), which is an example of step 212 of FIG. 2 (i.e., transmit recommendation to content creator recommending one or more aspects of the one or more identified snippets to be improved). In conversation 338, bot reaches out to Bob with the message 340a ("Hi Bob, the following snippet of your article has a low content effectiveness score . . . You may want to edit the snippet, so that more users will find this snippet to be helpful. Let me know once you have made your changes."). It is assumed in conversation 338 that Bob is the author of article 302. If not already apparent, the request of bot may be specific to a particular snippet of an article. In the present example, Bob is requested to revise the portion of article 302 corresponding to snippet 304a. Such targeted revision request is advantageous as it lets a content creator know exactly which portion of his/her article needs revision.

While not depicted in the example of FIG. 3G, it is possible that some of the user messages that resulted in the presentation of snippet 304a could be provided to the content creator. For instance, message 308a from Alice could be provided to the content creator so that the content creator has a better idea of how the snippet should be revised. Continuing with conversation 338, Bob may reply with message 340c ("Thanks for letting me know that the snippet needs improvement. It has been updated now. Hopefully, more users will find the snippet to be helpful now."). In reply, the bot may reply with message 340d ("Super! I will let you know in a few weeks whether your edits have made a positive impact on the readers."). While not depicted in sequence diagram 200 of FIG. 2, it is understood that for those snippets that were revised by content creator 108, automated agent 112 may continually monitor those snippets, and if their associated content effectiveness remains below the content effectiveness threshold for an extended period of time (e.g., 1 week), automated agent 112 may reach out to content creator 108 a second time to request the content creator to further revise the snippet. In summary, the example of FIGS. 3A-3G illustrates a bot facilitated process to determine one or more snippets with a low content effectiveness score, and the bot proactively reaching out to a content creator to improve the deficient snippet.

Figure 4A:
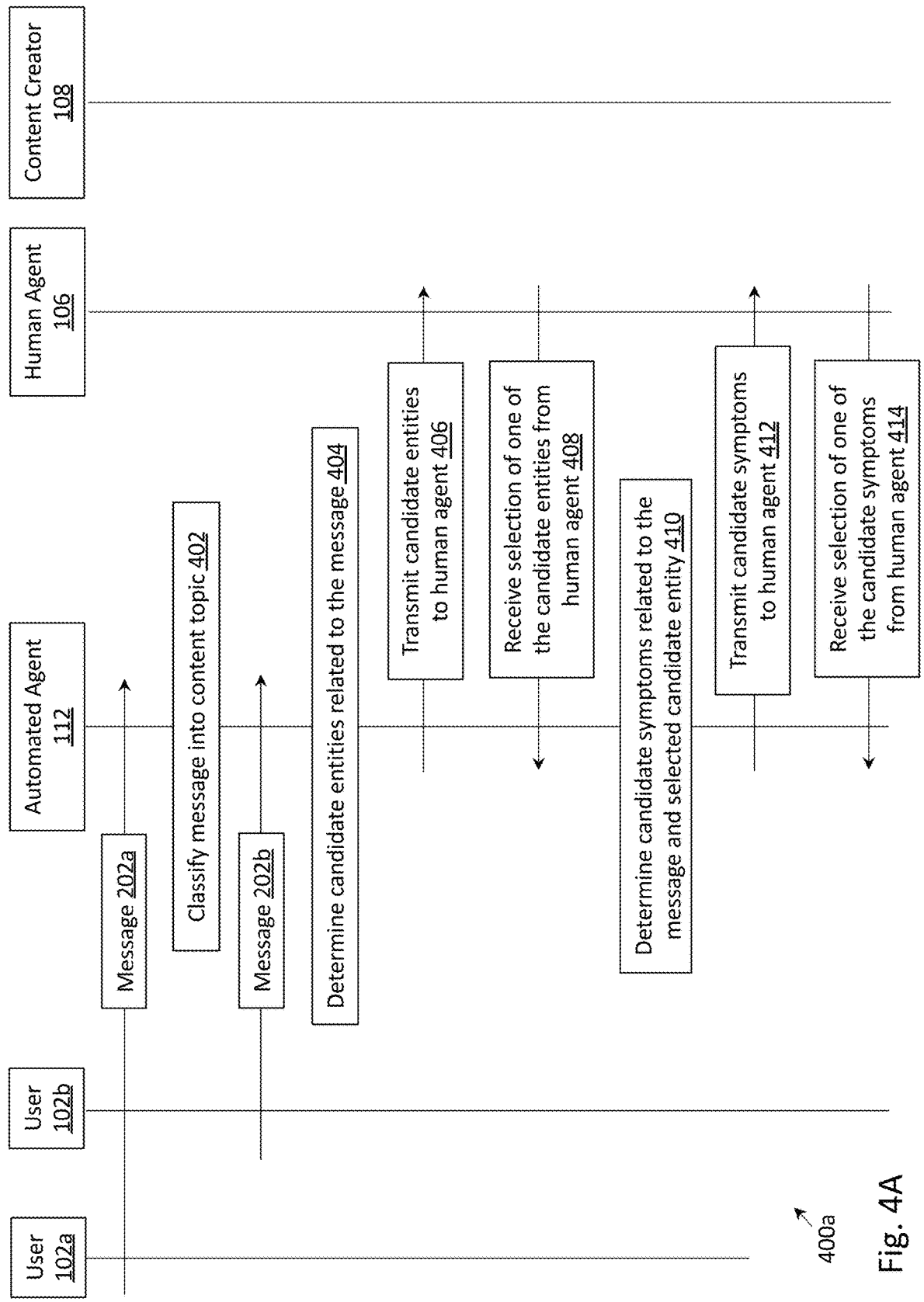
FIGS. 4A-4B depict a sequence diagram of a process for identifying one or more content topics for which the demand for the content topic is not sufficiently met by the availability of articles for the content topic, and recommending a content creator to create or share content associated with the one or more identified content topics, in accordance with one embodiment of the invention.
Figure 4B:
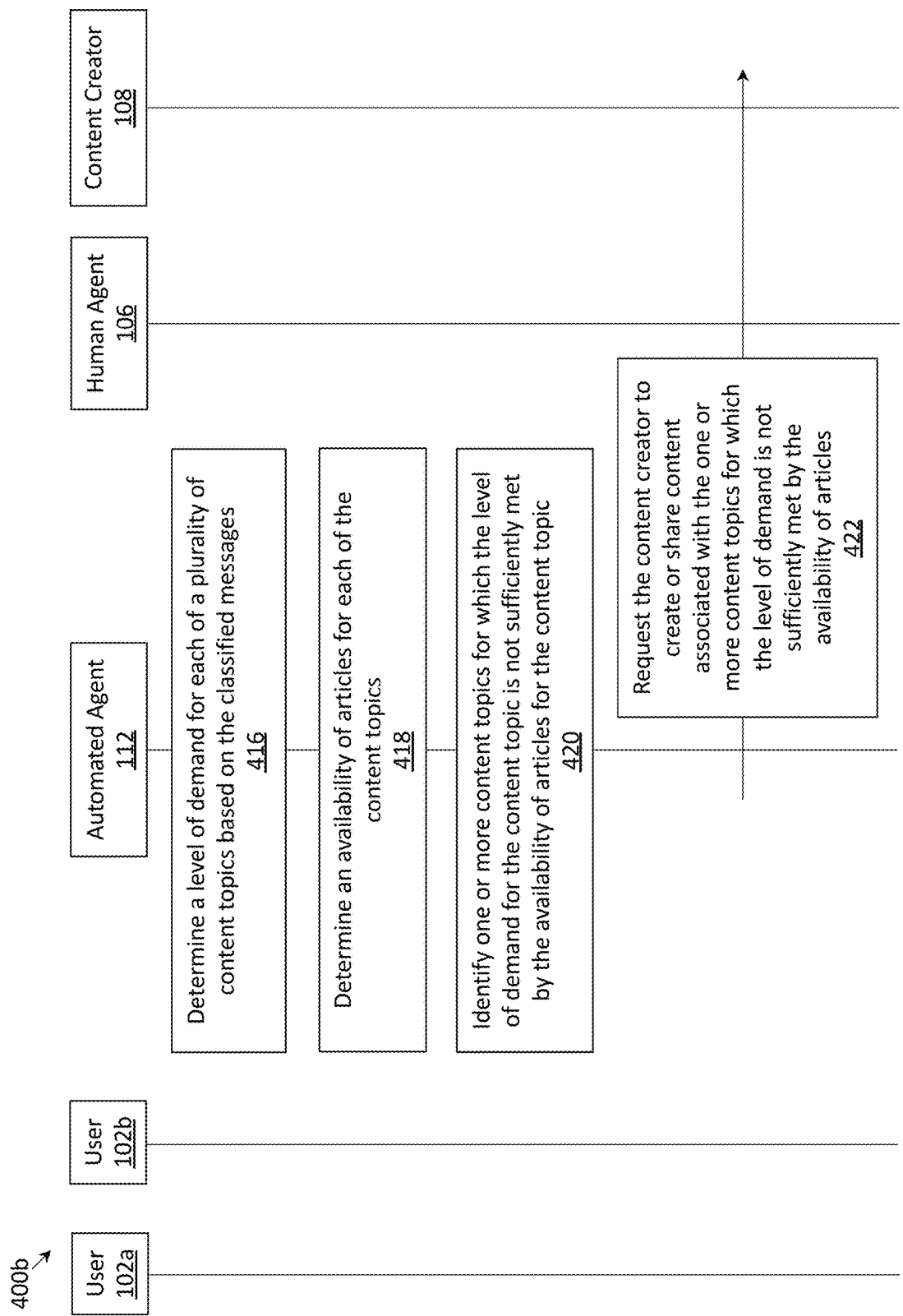

FIGS. 4A and 4B depict sequence diagrams 400a and 400b of a process for identifying one or more content topics for which the demand for the content topic is not sufficiently met by the availability of articles for the content topic, and recommending content creator 108 to create or share content associated with the one or more identified content topics. At step 202a, a message from user 102a may be received by automated agent 112. Similar to the examples provided above, the message may be a request/query or may describe a problem.

At step 402, automated agent 112 may classify the message into a content topic that is characterized by the pairing of an entity with a symptom. As described above, an entity may be a business entity, a software application or a hardware component, and a symptom may be a specific issue or problem associated with the entity. In step 402, such classification may be performed automatically by entity identification module 124 and symptom identification module 126, which may be jointly implemented using a neural network. For instance, a neural network could be trained using human classified messages (e.g., message 1⇔[<ABC>, login issue]; message 2⇔[<defy, no audio], etc.). After parameters of the neural network have been optimized, the neural network can be used to automatically classify messages into content topics, as expressed with the pairing of an entity with a symptom.

There, however, may be instances in which the entity returned by entity identification module 124 and/or the symptom returned by symptom identification module 126 have a low confidence score. In these instances, the assistance of a human agent 106 may be relied upon to arrive at a content topic. Such a scenario is described by the classification of the message that is received at step 202b. At step 404, the most likely entity identified by entity identification module 124 may have a low confidence score, so instead of identifying only one entity, entity identification module 124 identifies a plurality of candidate entities that are related to the message. At step 406, automated agent 112 may transmit the candidate entities to human agent 106. At step 408, human agent 106 may select one of the candidate entities, and send the selected entity to automated agent 112.

At step 410, the top symptom identified by symptom identification module 126 may also have a low confidence score, so similarly, instead of identifying only one symptom, symptom identification module 126 may identify a plurality of candidate symptoms that are related to the message and the human-selected entity. At step 412, automated agent 112 may transmit the candidate symptoms to human agent 106. At step 414, human agent 106 may select one of the candidate symptoms and send the selected symptom to automated agent 112.

In sequence diagram 400a, human agent 106 first selected the candidate entity, and then selected the candidate symptom. As will be illustrated in the example to follow, it is also possible for human agent 106 to select the candidate symptom first, followed by the selection of the candidate entity. In addition, it is also possible for automated agent 112 to provide human agent 106 with candidate content topics, and human agent 106 may select one of the candidate content topics.

After a plurality of messages have been classified into content topics (either automatically by automated agent 112 or in a human-assisted classification process), automated agent 112 may determine a level of demand for each of the content topics (in step 416) based on the classification of the messages. More specifically, the level of demand for a content topic may be measured based on the number of messages classified for that content topic.

At step 418, automated agent 112 may determine an availability of articles for each of the content topics. More specifically, the availability of articles for a content topic may be measured based on the number of articles that are available for that content topic. In one refinement, the availability of articles for a content topic may be measured based on the number of articles that are available for that content topic, and further the articles are required to have a content effectiveness above a certain threshold.

At step 420, automated agent 112 may identify one or more content topics for which the level of demand for the content topic is not sufficiently met by the availability of articles for the content topic. Whether the level of demand is sufficiently met by the availability of articles may be determined based on a non-linear relationship between the supply and demand. For instance, 10 messages received in a content topic may be sufficiently addressed by 1 article; 100 messages received in a content topic may be sufficiently addressed by 2 articles; 1000 messages received in a content topic may be sufficiently addressed by 3 articles; and 10,000 messages received in a content topic may also be sufficiently addressed by 3 articles.

At step 422, automated agent 112 may request content creator 108 to create or share content associated with the one or more content topics for which the level of demand is not sufficiently met by the availability of articles. An example that illustrates sequence diagrams 400a and 400b is provided in FIGS. 5A-5D below.

Figure 5A:
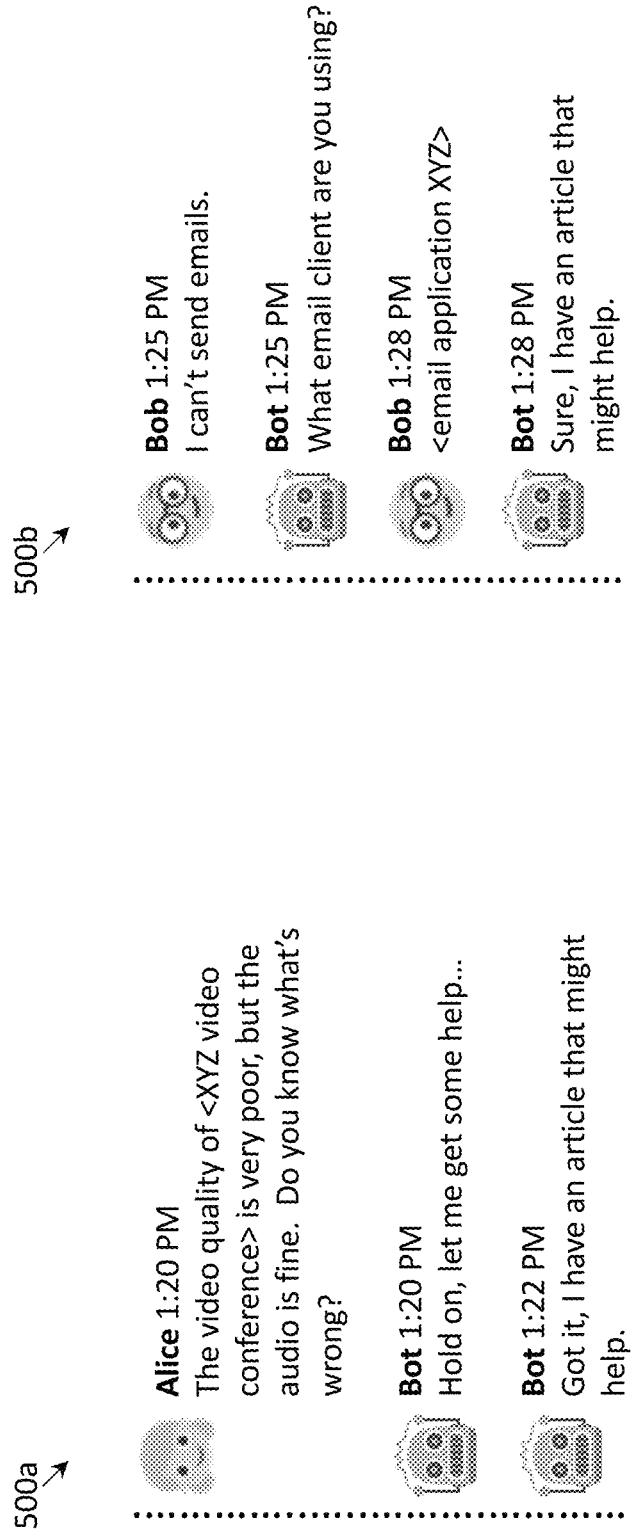
FIG. 5A depicts example conversations between an automated agent and a plurality of users, the conversations used to determine a level of demand for one or more content topics, in accordance with one embodiment of the invention.

FIG. 5A depicts conversations 500a and 500b, which illustrate the classification of messages. In conversation 500a, Alice transmits the message "The video quality of <XYZ video conference> is very poor, but the audio is fine. Do you know what's wrong?" In such instance, the bot is not sure how to classify Alice's message, so the bot replies with the message "Hold on, let me get some help . . . " and reaches out to a human agent (the conversation of which is presented in FIG. 5B). After the human agent determines the entity to be <ABC> and the symptom to be "internet connectivity", the bot replies to Alice with the message "Got it, I have an article that might help." To summarize, through a human-assisted classification process, the content topic of Alice's message was determined to be entity <ABC> and symptom "internet connectivity".

In conversation 500b, Bob transmits the message "I can't send emails" to the bot. In this instance, the bot is able to determine the symptom of the content topic to be "email not sending" with high confidence, so in this instance the bot does not reach out to the human agent for assistance. The bot then sends a follow-up message to Bob, "What email client are you using?" in order to determine the entity. Bob replies with the response "<email application XYZ>". Similarly, the bot is able to determine the entity of the content topic to be <email application XYZ> with high confidence, so again, the bot does not reach out to the human agent for assistance. The bot then replies "Sure, I have an article that might help". To summarize, through an automated process, the content topic of Bob's message was determined to be entity <email application XYZ> and symptom "email not sending".

FIG. 5B depicts conversation 502 in which an automated agent (bot) reaches out to a human agent (Frank) to determine the content topic of Alice's message (depicted in FIG. 5A). The bot messages Frank, "What do you think is causing the issue with the following message", displays Alice's message, and then displays several candidate symptoms (i.e., Internet connectivity, video camera, lighting in the room, video conference software). In response, Frank identifies the symptom as "internet connectivity" from the candidate symptoms. The bot then asks Frank, "Thanks, which business entity should the user contact to resolve the Internet connectivity issue?", and provides Frank with some candidate entities (i.e., <XYZ>, <ABC> and <123>). In response, Frank identifies the entity as <ABC>. The bot then provides a message of appreciation, "Thanks". Such example illustrates the complexity associated with classifying a message, as the entity (i.e., <ABC>) of the content topic did not even appear in Alice's message, so a pure keyword based classification process would have likely resulted in the incorrect content topic.

FIG. 5C depicts table 504 tabulating the demand for content, as organized by content topic, and table 506 tabulating the supply of content, also organized by content topic. In table 504, the columns specify entities, the rows specify symptoms, and the table entries record the number of messages received for each of the content topics, as specified by an entity-symptom pair. In table 506, the columns specify entities, the rows specify symptoms, and the table entries record the number of articles available for each of the content topics, as also specified by the same entity-symptom pairs as in table 504. It is noted that it is possible to view each of the tables as a "heat map", in which large values correspond to warmer colors, and smaller values correspond to cooler colors. A comparison by automated agent 112 between tables 504 and 506 may reveal a balance or an imbalance between the supply and demand for each of the content topics. For instance, automated agent 112 may determine that the content topic of <application 123>—"no audio" has an undersupply of articles. While there are 33 messages requesting information on the content topic of <application 123>—"no audio", there are no articles available to address such demand.

Figure 5D:
FIG. 5D depicts an example conversation between an automated agent and a content creator, in which the automated agent requests the content creator to create an article for a content topic for which the level of demand is not sufficiently met by the availability of articles, in accordance with one embodiment of the invention.
Figure 5D:
Figure 5D:
Figure 5D:
Figure 5D:
Figure 5D:

FIG. 5D depicts conversation 508 in which an automated agent (bot) reaches out to a content creator (Dave) to request Dave to create content for the content topic of <application 123>—"no audio". In the conversation, the bot messages Dave, "Hey Dave, We have received a lot of requests regarding users experiencing no sound for application <application 123>. Would you mind writing an article that describes a solution for users to fix this issue?". In response, Dave messages the bot, "Sure, that's no problem. I'll have it ready by tonight". The bot replies in appreciation, "Thanks!" Later, when Dave has added the article to knowledge datastore 138, Dave messages the bot, "I uploaded an article that describes a fix to the problem". The bot again replies in appreciation, "Thanks!" In summary, the example of FIG. 5A-5D illustrates a bot facilitated process to determine one or more content topics that have an insufficient supply of articles (relative to the demand for articles), and the bot proactively reaching out to a content creator to address the deficient content topic.

Figure 6A:
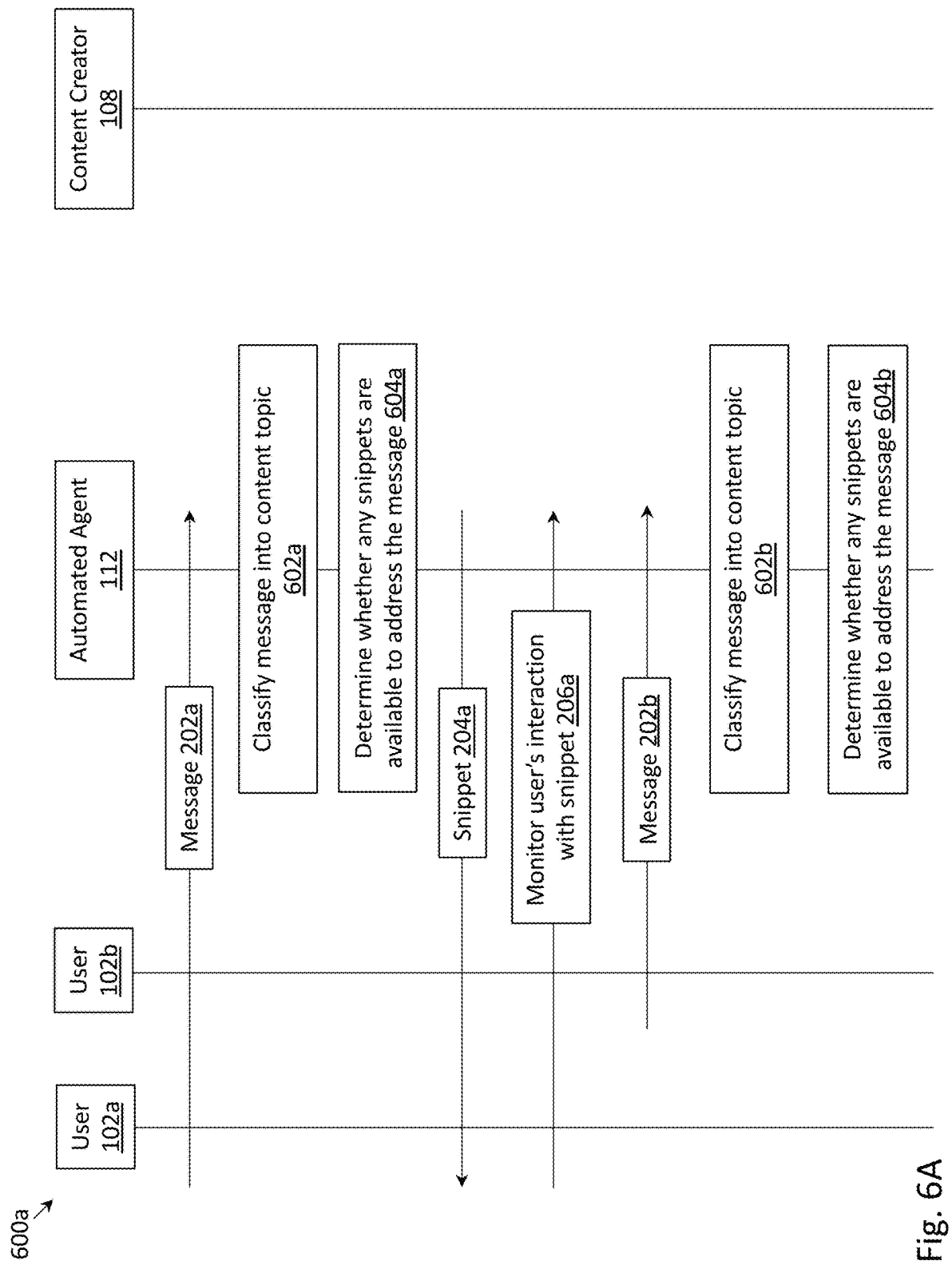
FIGS. 6A-6B depict a sequence diagram of a process for identifying one or more content topics with a low message responsiveness and/or a low content effectiveness, and requesting a content creator to creator or share content associated with the identified one or more content topics, in accordance with one embodiment of the invention.
Figure 6B:
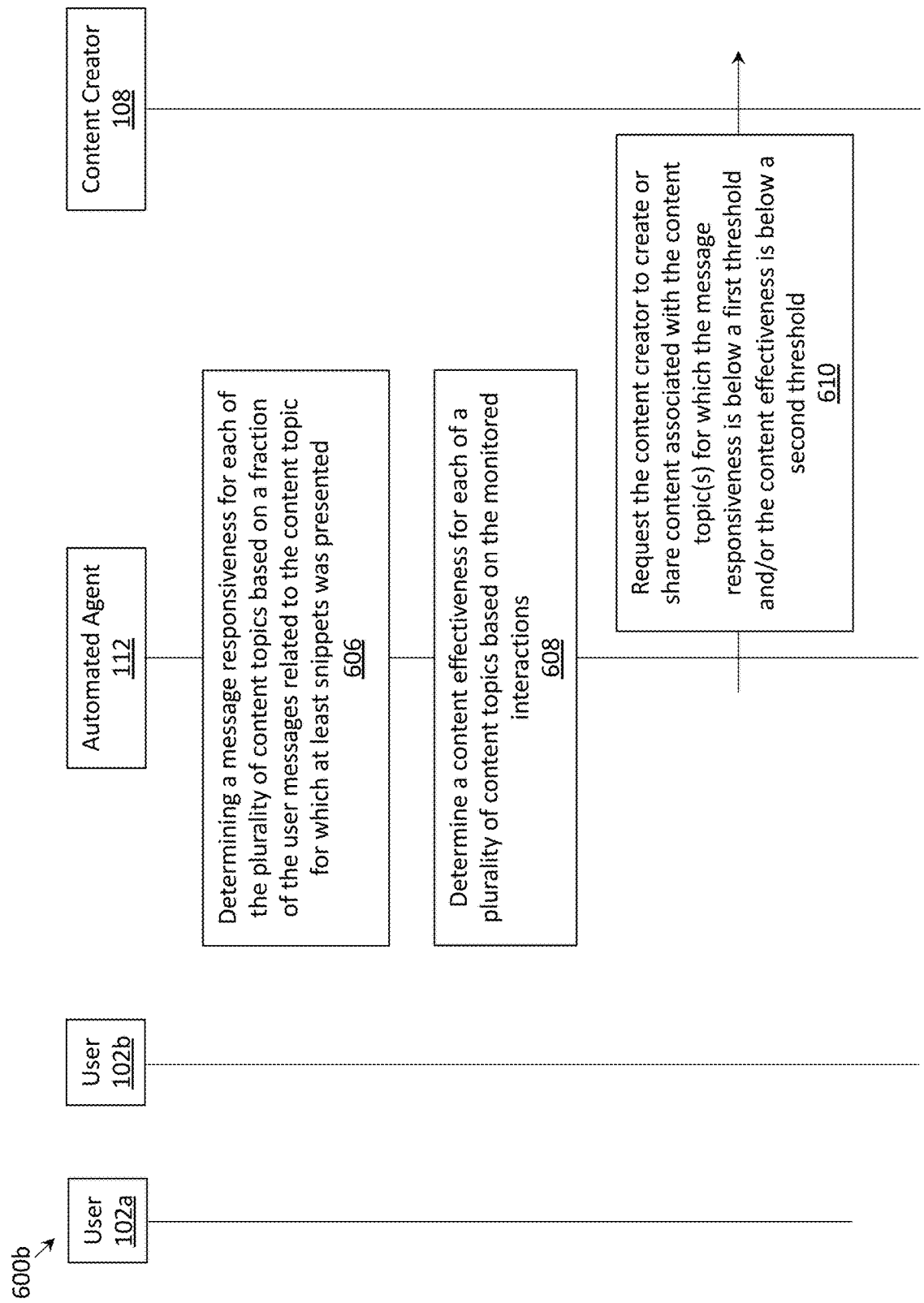

FIGS. 6A-6B depict sequence diagrams 600a and 600b of a process for identifying one or more content topics with a low message responsiveness and/or a low content effectiveness, and requesting a content creator to creator or share content associated with the identified content topics. Such process has some similarities to the process of FIGS. 2A-2B, in that automated agent 112 monitors the interaction of the users with snippets. However, instead of aggregating the feedback on the granular level of individual snippets, the process of FIGS. 6A-6B aggregates the feedback on the coarser level of content topics. Further, the process of FIGS. 6A-6B additionally monitors whether any snippet was provided at all in response to a message, which was not explicitly described in FIGS. 2A-2B.

In step 202a, a message is received by automated agent 112 from user 102a. In step 602a, automated agent 112 may classify the message into a content topic. Such classification (e.g., automated or human assisted) was previously described in FIGS. 4A-4B. In step 604a, automated agent 112 may determine whether any snippets are available to address the message received from user 102a. For example, automated agent 112 may search for snippets within articles that have been classified under the content topic determined in step 602a. In the example of FIG. 6A, automated agent 112 is able to locate a snippet, which is then transmitted to user 102a in step 204a. In step 206a, automated agent 112 further monitors the interaction of user 102a with the snippet.

In step 202b, a message is received by automated agent 112 from user 102b. In step 602b, automated agent 112 may classify the message into a content topic. In step 604a, automated agent 112 may determine whether any snippets are available to address the message received from user 102a. In the example of FIG. 6A, no snippets are available to address the message from user 102b, and hence no snippet is returned to user 102b in response to message 202b. While not depicted, it is understood that an apology message may be transmitted to user 102b (e.g., "Sorry, I am not sure I have any information that will be useful for you"). It is understood that many messages may be received from a plurality of users and processed in a similar fashion to that described in FIG. 6A before the process continues to step 606 depicted in FIG. 6B.

In step 606, automated agent 112 may determine a message responsiveness for each of a plurality of content topics based on the fraction of the user messages related to the content topic for which at least one snippet was presented. Such determination is described below in FIG. 6C. In step 608, automated agent 112 may determine a content effectiveness for each of a plurality of content topics based on the monitored interactions. Such determination is described below in FIG. 6D. Finally, in step 610, automated agent 112 may request content creator 108 to create or share content associated with the content topic(s) for which the message responsiveness is below a first threshold and/or the content effectiveness is below a second threshold.

Figures 7A, 7B:
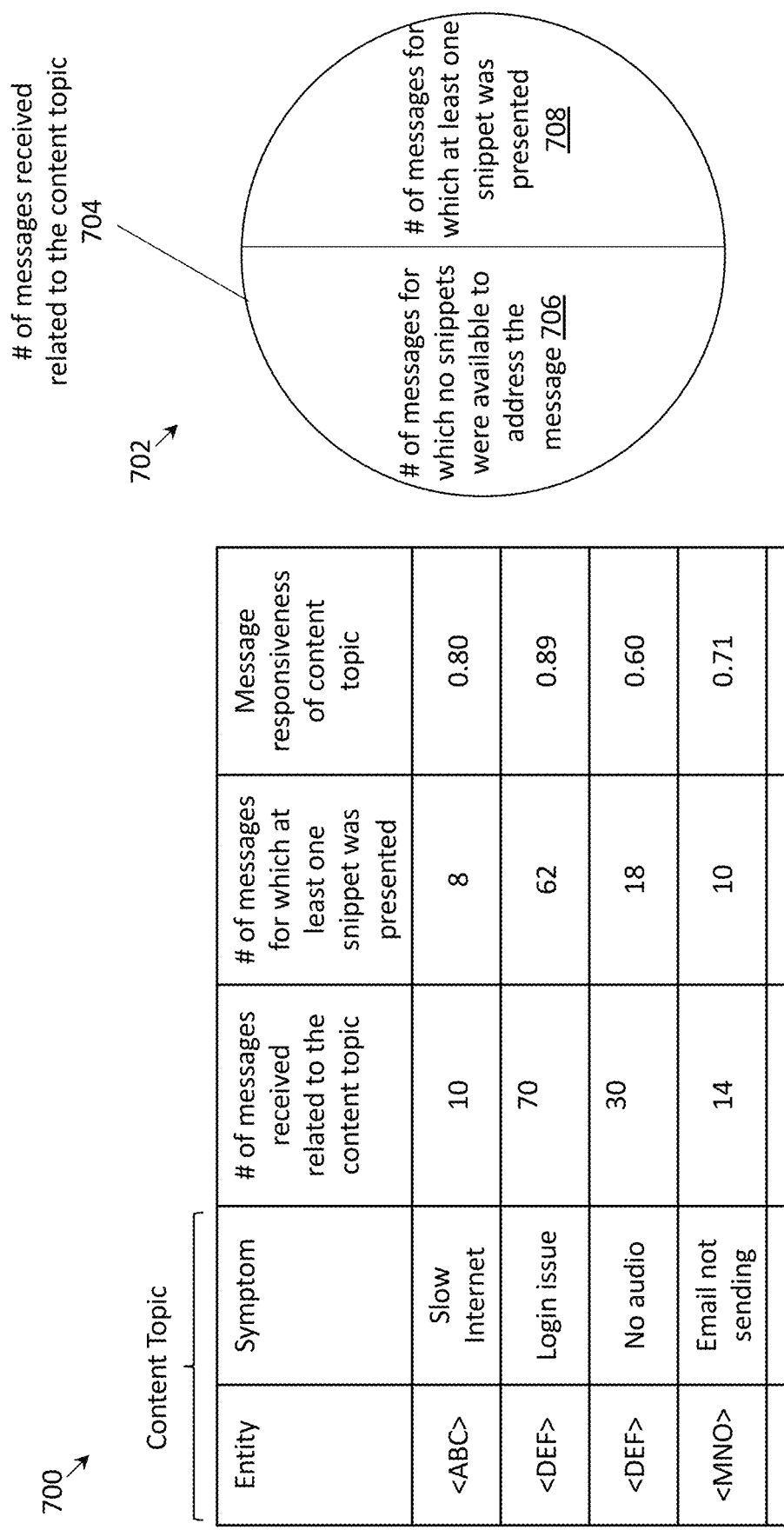
FIG. 7A depicts a table that tabulates the message responsiveness for a plurality of content topics as well as metrics that may be used to compute the message responsiveness, in accordance with one embodiment of the invention.
FIG. 7B depicts a graphic that illustrates the relationship between various metrics from FIG. 7A that may be used to compute the message responsiveness, in accordance with one embodiment of the invention.

FIG. 7A depicts table 700 that tabulates the message responsiveness (in column 5) for a plurality of content topics as well as metrics (in columns 3-4) used to compute the message responsiveness. Columns 1 and 2 of table 700 record an entity and symptom, the pairing of which characterizes a content topic. Column 3 tabulates the number of messages received, in a certain time period (e.g., 1 day, 1 week, etc.), that are related to the content topic. Column 4 tabulates, for those messages tabulated in column 3, the number of messages for which at least one snippet was presented. It is noted that the statistics of columns 3 and 4 relies upon the classification of messages into each of the content topics (e.g., performed in steps 602a and 602b of FIG. 6A). Column 5 tabulates the message responsiveness computed for each of the content topics. In the example of FIG. 7A, the message responsiveness for each content topic is computed as the entry of the content topic in column 4 divided by the entry of the content topic in column 3. As can be observed from table 700, the content topic of <DEF>—no audio has the lowest message responsiveness, whereas the content topic of <DEF>—login issue has the highest message responsiveness.

FIG. 7B depicts graphic 702 that illustrates the relationship between the metrics from FIG. 7A that may be used to compute the message responsiveness. Graphic 702 illustrates that the sum of the number of message received for a content topic for which no snippets were available to address the message (706) and the number of messages received for that content topic for which at least one snippet was presented (708) equals the number of messaged received for that content topic (704). Therefore, the message responsiveness can be understood as the fraction of messages (for a given content topic) for which at least one snippet was presented.

Figures 7C, 7D:
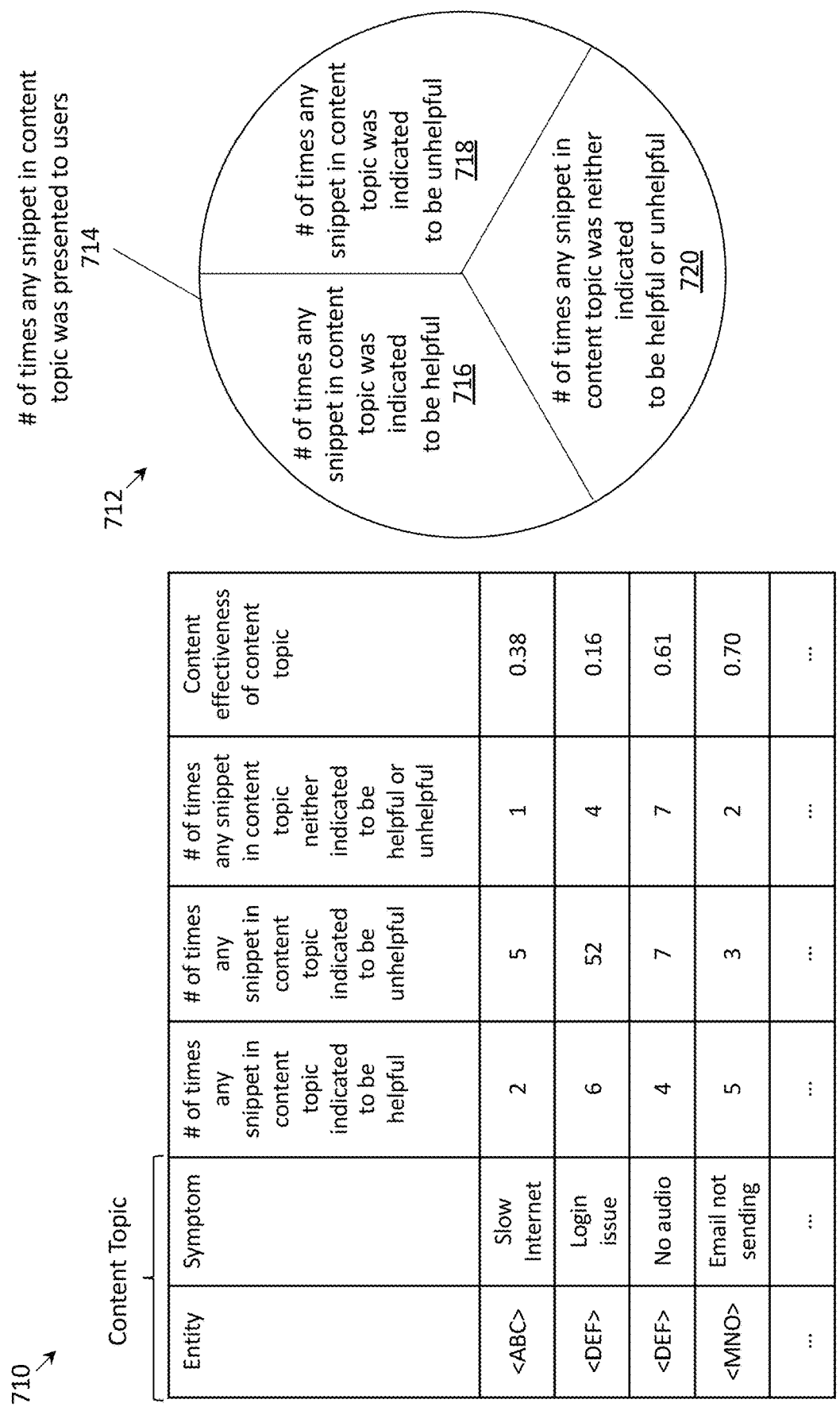
FIG. 7C depicts a table that tabulates the content effectiveness for a plurality of content topics as well as metrics that may be used to compute the content effectiveness, in accordance with one embodiment of the invention.
FIG. 7D depicts a graphic that illustrates the relationship between various metrics from FIG. 7C that may be used to compute the content effectiveness, in accordance with one embodiment of the invention.

FIG. 7C depicts table 710 that tabulates the content effectiveness (column 6) for a plurality of content topics as well as metrics (columns 3-5) to compute the content effectiveness. Columns 1 and 2 of table 710 record an entity and symptom, the pairing of which characterizes a content topic. Column 3 of table 710 tabulates the number of times any snippet in a certain content topic (for a certain time period) was indicated to be helpful. Such data is similar to the data tabulated in column 3 of table 324, except that the data in table 710 has been aggregated across one or more snippets belonging to a certain content topic. Column 4 of table 710 tabulates the number of times any snippet in a certain content topic (for the same time period as considered in column 3) was indicated to be unhelpful. Column 5 of table 710 tabulates the number of times any snippet in a certain content topic (for the same time period as considered in column 3) was neither indicated to be helpful or unhelpful. Other statistics for each of the content topics are possible, but have not been depicted in FIG. 7C for conciseness of presentation. These statistics include, for example, the number of times a ticket was filed after presentation of any snippet in a content topic; the number of times a full article link was selected after presentation of any snippet in a content topic; etc. Column 6 depicts the content effectiveness for each of the content topics. In the example of FIG. 7C, the content effectiveness for a content topic has been computed as one minus the entry of the content topic in column 4 divided by the sum of entries of the content topic in columns 3-5.

FIG. 7D depicts graphic 714 that illustrates the relationship between various metrics from FIG. 7C that may be used to compute the content effectiveness. Graphic 714 illustrates that the sum of the number of times any snippet in a certain content topic was indicated to be helpful (716), the number of times any snippet in the same content topic was indicated to be unhelpful (718), and the number of times any snippet in the same content topic was neither indicated to be helpful or unhelpful (720) is equal to the number of times any snippet in a content topic was presented to users (714).

In the example of FIGS. 7A and 7C, suppose that the threshold for message responsiveness and content effectiveness are both set at 0.5. Therefore, all content topics in FIG. 7A have sufficient message responsiveness. However, two of the four content categories in FIG. 7C have insufficient content effectiveness: <ABC>—Slow Internet, <DEF>—Login issue. FIG. 7E depicts conversation 722 in which an automated agent (bot) requests a content creator (Erin) to create an article to address one of the content topics that was found to have an insufficient content effectiveness. In message 724a, the bot messages Erin, "Hi Erin, there aren't many good articles that address the login issue for the <DEF entity>. Would you mind writing an article that we can add to the repository?" In message 724b, Erin replies, "Sure. Give me a day, and I'll have it ready." In message 724c, the bot replies with a message of appreciation, "Thanks!". In message 724d, Erin informs the bot that the article has been uploaded to knowledge datastore 138, "I just uploaded an article that addresses the login issue for the <DEF entity>. Hopefully, people will find it to be helpful." The bot again replies with a message of appreciation, "Super! I'm sure it will help. Thanks!". In summary, the example of FIGS. 7A-7E illustrates a bot facilitated process to determine one or more content topics that are deficient (e.g., in terms of message responsiveness and/or content effectiveness), and the bot proactively reaching out to a content creator to address the deficient content topic.

Figure 8:
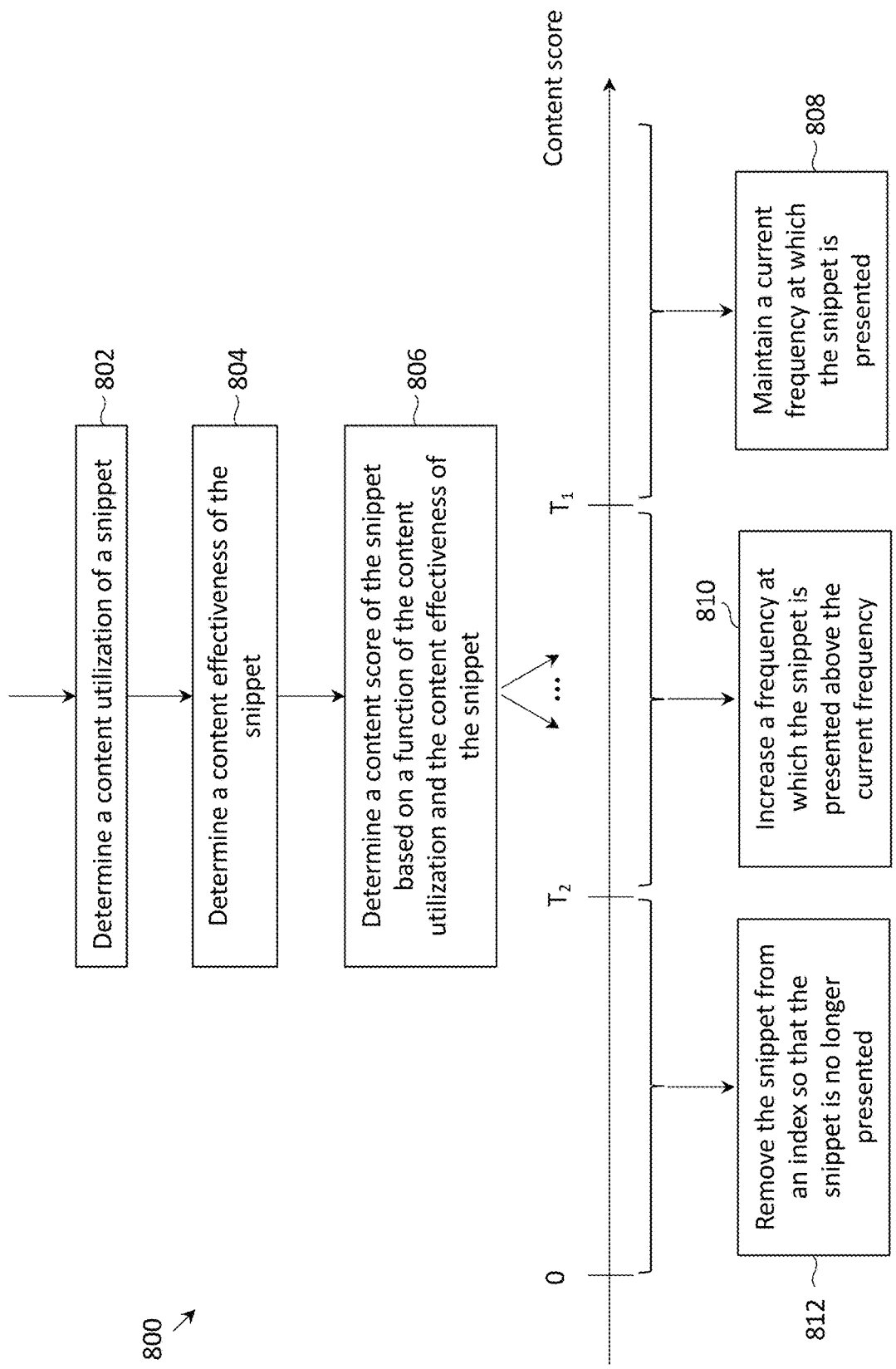
FIG. 8 depicts a flow diagram of a process for adjusting a frequency in the presentation of a snippet based on the content utilization and the content effectiveness of the snippet, in accordance with one embodiment of the invention.

FIG. 8 depicts flow diagram 800 of a process for adjusting (or maintaining) a frequency in the presentation of a snippet based on the content utilization and the content effectiveness of the snippet. At step 802, automated agent 112 may compute the content utilization of the snippet as the number of times the snippet was presented for a certain content topic divided by the number of messages received for the content topic. For example, if 100 user messages were received in the content topic of entity <ABC>—slow internet, and snippet A were returned in response to 33 of the user messages in that content topic, the content utilization of snippet A would be 0.33.

At step 804, automated agent 112 may determine the content effectiveness of the snippet. The determination of the content effectiveness of a snippet was previously explained in FIG. 3E, and hence will not be repeated. At step 806, automated agent 112 may compute a content score based on the content utilization and the content effectiveness of the snippet. For example, the content score may be computed as the product of the content utilization and the content effectiveness of the snippet.

If the content score of the snippet is above a first threshold, automated agent 112 may maintain a current frequency at which the snippet is presented (808). In most cases, a high content score indicates a snippet with a high content utilization and a high content utilization, so no changes are needed in light of the determination of this ideal scenario.

If the content score of the snippet is below the first threshold, but above a second threshold, automated agent 112 may increase a frequency at which the snippet is presented above the current frequency (810). In most cases, such a moderate content score results from a snippet with a low content utilization and a high content effectiveness. On the other hand, it is possible for a moderate content score to result from a snippet with a high content utilization and a low content effectiveness. However, in practice, it is unlikely that a snippet with a low content effectiveness would have a high content utilization, so in all practicality, such a possibility can be ruled out.

If the content score is below the second threshold, automated agent 112 may remove the snippet from an index so that the snippet is no longer presented. In most cases, a low content score would result from a snippet with a low content utilization and a low content effectiveness. Snippets with a low content score may identify a snippet with outdated content, content that is no longer applicable, incorrect content, etc. To summarize, flow diagram 800 describes a process that enhances the snippet selection process of message servicing module 116 by promoting the "hidden gems", and deprecating the snippets with a low content score.

Figure 9:
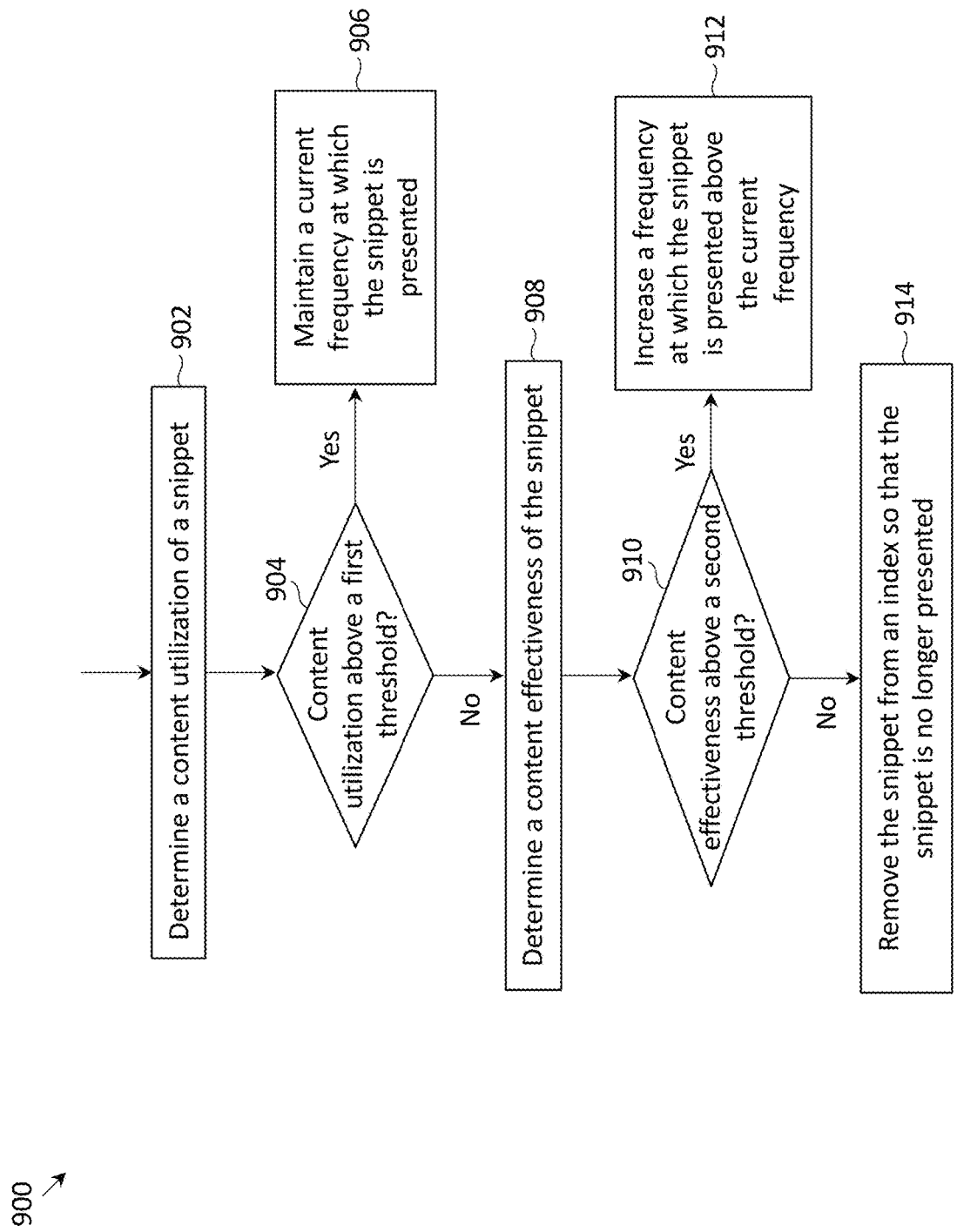
FIG. 9 depicts a flow diagram of another process for adjusting a frequency in the presentation of a snippet based on the content utilization and the content effectiveness of the snippet, in accordance with one embodiment of the invention.

FIG. 9 depicts flow diagram 900 of another process for adjusting (or maintaining) a frequency in the presentation of a snippet based on the content utilization and the content effectiveness of the snippet. Flow diagram 900 is a variant of flow diagram 800 that adjusts the frequency of the presentation of snippets based on the content utilization and the content effectiveness explicitly, rather than based on the content score, as described in flow diagram 800. At step 902, automated agent 112 may determine a content utilization of a snippet (in a similar fashion as step 802 of FIG. 8). At step 904, automated agent 112 may determine whether the content utilization of the snippet is above a first threshold. If so, automated agent 112 may maintain a current frequency at which the snippet is presented (similar to step 808 of FIG. 8). At step 908, automated agent 112 may determine a content effectiveness of the snippet (in a similar fashion as step 804). At step 910, automated agent 112 may determine whether the content effectiveness of the snippet is above a second threshold. If so, automated agent 112 may increase a frequency at which the snippet is presented above the current frequency (similar to step 810 of FIG. 8). Otherwise, automated agent 112 may remove the snippet from an index so that the snippet is no longer presented (similar to step 812 of FIG. 8).

Figure 10:
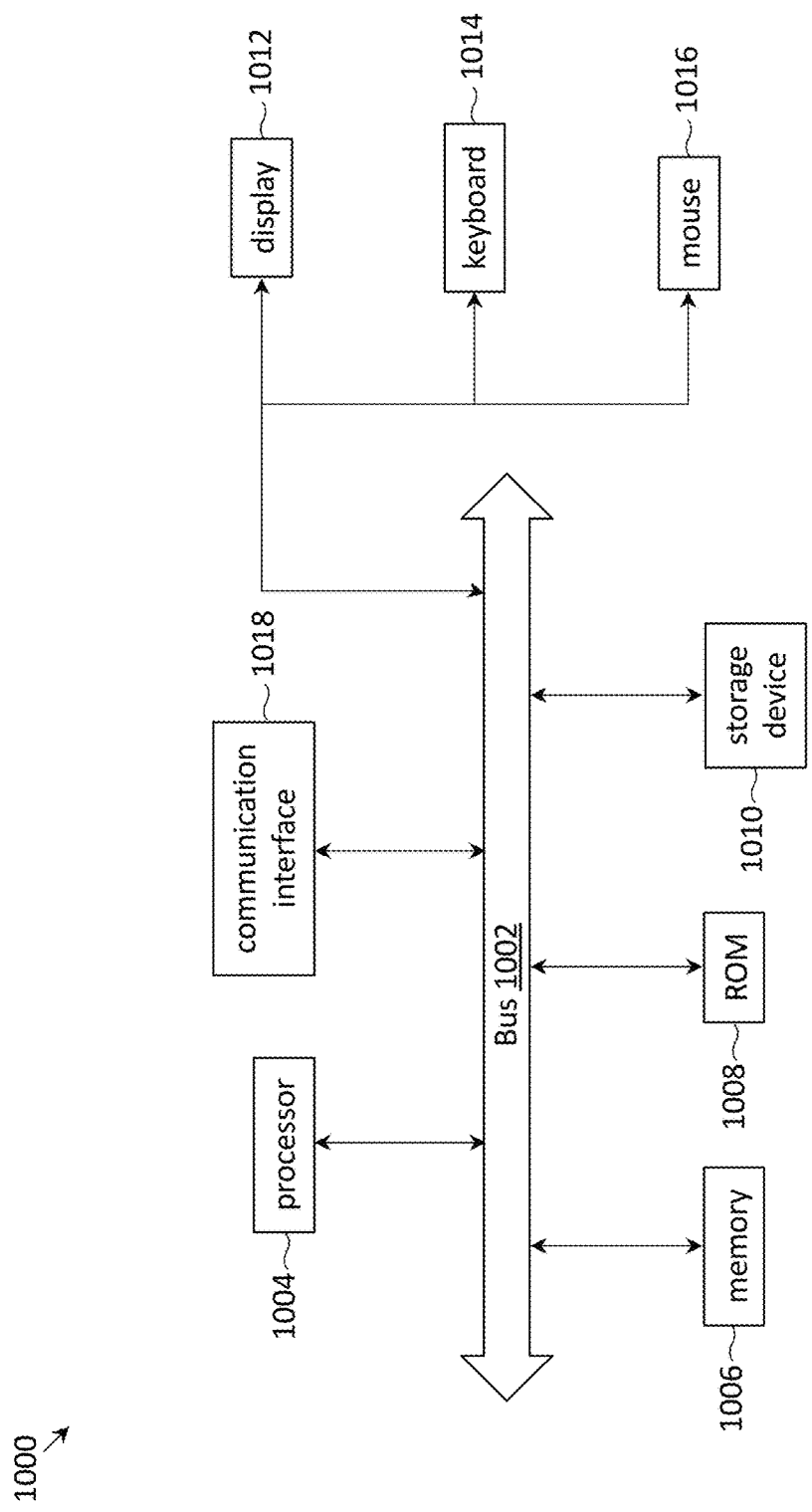
FIG. 10 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 10 provides an example of a system 1000 that may be representative of any of the computing systems (e.g., client devices 104a-104f and server 111) discussed herein. Examples of system 1000 may include a smartphone, a desktop computer, a laptop computer, a mainframe computer, an embedded system, etc. Note, not all of the various computer systems have all of the features of system 1000. For example, certain ones of the computer systems discussed above may not include a display inasmuch as the display function may be provided by a client computer communicatively coupled to the computer system or a display function may be unnecessary. Such details are not critical to the present invention.

System 1000 includes a bus 1002 or other communication mechanism for communicating information, and a processor 1004 coupled with the bus 1002 for processing information. Computer system 1000 also includes a main memory 1006, such as a random access memory (RAM) or other dynamic storage device, coupled to the bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to the bus 1002 for storing static information and instructions for the processor 1004. A storage device 1010, for example a hard disk, flash memory-based storage medium, or other storage medium from which processor 1004 can read, is provided and coupled to the bus 1002 for storing information and instructions (e.g., operating systems, applications programs and the like).

Computer system 1000 may be coupled via the bus 1002 to a display 1012, such as a flat panel display, for displaying information to a computer user. An input device 1014, such as a keyboard including alphanumeric and other keys, may be coupled to the bus 1002 for communicating information and command selections to the processor 1004. Another type of user input device is cursor control device 1016, such as a mouse, a trackpad, or similar input device for communicating direction information and command selections to processor 1004 and for controlling cursor movement on the display 1012. Other user interface devices, such as microphones, speakers, etc. are not shown in detail but may be involved with the receipt of user input and/or presentation of output.

The processes referred to herein may be implemented by processor 1004 executing appropriate sequences of computer-readable instructions contained in main memory 1006. Such instructions may be read into main memory 1006 from another computer-readable medium, such as storage device 1010, and execution of the sequences of instructions contained in the main memory 1006 causes the processor 1004 to perform the associated actions. In alternative embodiments, hard-wired circuitry or firmware-controlled processing units may be used in place of or in combination with processor 1004 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1000 or similar electronic computing device, that manipulates and transforms data represented as physical (electronic) quantities within its registers and memories into other data similarly represented as physical quantities within its memories or registers or other such information storage, transmission or display devices.

Computer system 1000 also includes a communication interface 1018 coupled to the bus 1002. Communication interface 1018 may provide a two-way data communication channel with a computer network, which provides connectivity to and among the various computer systems discussed above. For example, communication interface 1018 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1000 can send and receive messages and data through the communication interface 1018 and in that way communicate with hosts accessible via the Internet. It is noted that the components of system 1000 may be located in a single device or located in a plurality of physically and/or geographically distributed devices.

Thus, methods for evaluating and improving the content of a knowledge datastore have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
    receiving, by an automated agent, a plurality of messages from a plurality of users within a first time period;
    determining, by the automated agent, a level of demand within the first time period for each of a plurality of content topics based on the plurality of messages,
        wherein determining the level of demand for each of the plurality of content topics comprises mapping each of the plurality of messages to one of the plurality of content topics,
        wherein mapping each of the plurality of messages to one of the plurality of content topics comprises, for each of the messages:
            determining a plurality of candidate entities related to the message;
            transmitting the message and the plurality of candidate entities to a human agent; and
            receiving a selection of one of the plurality of candidate entities from the human agent,
        wherein mapping each of the plurality of messages to one or more of the plurality of content topics further comprises, for each of the messages and the candidate entity selected for the respective message:
            determining a plurality of candidate symptoms related to the message and the selected candidate entity;
            transmitting the message and the plurality of candidate symptoms to the human agent; and
            receiving a selection of one of the plurality of candidate symptoms from the human agent,
    determining, by the automated agent, an availability of articles for each of the plurality of content topics;
    determining, by the automated agent, one or more content topics from the plurality of content topics for which the level of demand for the respective content topic is not sufficiently met by the availability of articles for the respective content topic; and
    transmitting, by the automated agent, a request to a content creator, the request requesting the content creator create or share content associated with the one or more content topics for which the level of demand is not sufficiently met by the availability of articles.

2. The method of claim 1, wherein the level of demand for a first one of the plurality of content topics is determined based on a total number of messages from the plurality of requests that are related to the first content topic.

3. The method of claim 1, wherein the level of demand for a first one of the plurality of content topics is determined based on a total number of users from the plurality of users who transmitted, within the first time period, a message to the automated agent that is related to the first content topic.

4. The method of claim 1, wherein the determination of the availability of articles assesses a total number of articles that are available for each of the plurality of content topics.

5. The method of claim 1, wherein the plurality of candidate entities includes one or more of a plurality of business entities, a plurality of software applications, or a plurality of hardware components.

6. A computing device comprising a processor and memory storing instructions that, when executed by the processor, cause the processor to:
    instantiate an automated agent on the computing device;
    receive, by the automated agent, a plurality of messages from a plurality of users within a first time period;
    determine, by the automated agent, a level of demand within the first time period for each of a plurality of content topics based on the plurality of messages,
        wherein determining the level of demand for each of the plurality of content topics comprises mapping each of the plurality of messages to one of the plurality of content topics,
        wherein mapping each of the plurality of messages to one of the plurality of content topics comprises, for each of the messages:
            determining a plurality of candidate entities related to the message;
            transmitting the message and the plurality of candidate entities to a human agent; and
            receiving a selection of one of the plurality of candidate entities from the human agent,
        wherein mapping each of the plurality of messages to one or more of the plurality of content topics further comprises, for each of the messages and the candidate entity selected for the respective message:
            determining a plurality of candidate symptoms related to the message and the selected candidate entity;
            transmitting the message and the plurality of candidate symptoms to the human agent; and
            receiving a selection of one of the plurality of candidate symptoms from the human agent,
    determine, by the automated agent, an availability of articles for each of the plurality of content topics;
    determine, by the automated agent, one or more content topics from the plurality of content topics for which the level of demand for the respective content topic is not sufficiently met by the availability of articles for the respective content topic; and
    transmit, by the automated agent, a request to a content creator, the request requesting the content creator create or share content associated with the one or more content topics for which the level of demand is not sufficiently met by the availability of articles.

7. The computing device of claim 6, wherein the level of demand for a first one of the plurality of content topics is determined based on a total number of messages from the plurality of requests that are related to the first content topic.

8. The computing device of claim 6, wherein the level of demand for a first one of the plurality of content topics is determined based on a total number of users from the plurality of users who transmitted, within the first time period, a message to the automated agent that is related to the first content topic.

9. The computing device of claim 6, wherein the determination of the availability of articles assesses a total number of articles that are available for each of the plurality of content topics.

10. The computing device of claim 6, wherein the plurality of candidate entities includes one or more of a plurality of business entities, a plurality of software applications, or a plurality of hardware components.

11. A non-transitory machine-readable storage medium comprising instructions that, when executed by a processor, cause the processor to:
instantiate an automated agent on a computing device;
receive, by the automated agent, a plurality of messages from a plurality of users within a first time period;
determine, by the automated agent, a level of demand within the first time period for each of a plurality of content topics based on the plurality of messages,
wherein determining the level of demand for each of the plurality of content topics comprises mapping each of the plurality of messages to one of the plurality of content topics,
wherein mapping each of the plurality of messages to one of the plurality of content topics comprises, for each of the messages:
determining a plurality of candidate entities related to the message;
transmitting the message and the plurality of candidate entities to a human agent; and
receiving a selection of one of the plurality of candidate entities from the human agent,
wherein mapping each of the plurality of messages to one or more of the plurality of content topics further comprises, for each of the messages and the candidate entity selected for the respective message:
determining a plurality of candidate symptoms related to the message and the selected candidate entity;
transmitting the message and the plurality of candidate symptoms to the human agent; and
receiving a selection of one of the plurality of candidate symptoms from the human agent,
determine, by the automated agent, an availability of articles for each of the plurality of content topics;
determine, by the automated agent, one or more content topics from the plurality of content topics for which the level of demand for the respective content topic is not sufficiently met by the availability of articles for the respective content topic; and
transmit, by the automated agent, a request to a content creator, the request requesting the content creator create or share content associated with the one or more content topics for which the level of demand is not sufficiently met by the availability of articles.

12. The non-transitory machine-readable storage medium of claim 11, wherein the level of demand for a first one of the plurality of content topics is determined based on a total number of messages from the plurality of requests that are related to the first content topic.

13. The non-transitory machine-readable storage medium of claim 11, wherein the level of demand for a first one of the plurality of content topics is determined based on a total number of users from the plurality of users who transmitted, within the first time period, a message to the automated agent that is related to the first content topic.

14. The non-transitory machine-readable storage medium of claim 11, wherein the determination of the availability of articles assesses a total number of articles that are available for each of the plurality of content topics.

15. The non-transitory machine-readable storage medium of claim 11, wherein the plurality of candidate entities includes one or more of a plurality of business entities, a plurality of software applications, or a plurality of hardware components.

16. A method, comprising:
receiving, by an automated agent, a plurality of messages from a plurality of users within a first time period;
determining, by the automated agent, a level of demand within the first time period for each of a plurality of content topics based on the plurality of messages,
wherein determining the level of demand for each of the plurality of content topics comprises mapping each of the plurality of messages to one of the plurality of content topics,
wherein mapping each of the plurality of messages to one of the plurality of content topics comprises, for each of the messages:
determining a plurality of candidate symptoms related to the message;
transmitting the message and the plurality of candidate symptoms to a human agent; and
receiving a selection of one of the plurality of candidate symptoms from the human agent,
wherein mapping each of the plurality of messages to one or more of the plurality of content topics further comprises, for each of the messages and the candidate symptom selected for the respective message:
determining a plurality of candidate entities related to the message and the selected candidate symptom;
transmitting the message and the plurality of candidate entities to the human agent; and
receiving a selection of one of the plurality of candidate entities from the human agent,
determining, by the automated agent, an availability of articles for each of the plurality of content topics;
determining, by the automated agent, one or more content topics from the plurality of content topics for which the level of demand for the respective content topic is not sufficiently met by the availability of articles for the respective content topic; and
transmitting, by the automated agent, a request to a content creator, the request requesting the content creator create or share content associated with the one or more content topics for which the level of demand is not sufficiently met by the availability of articles.

17. The method of claim 16, wherein the level of demand for a first one of the plurality of content topics is determined based on a total number of messages from the plurality of requests that are related to the first content topic.

18. The method of claim 16, wherein the level of demand for a first one of the plurality of content topics is determined based on a total number of users from the plurality of users who transmitted, within the first time period, a message to the automated agent that is related to the first content topic.

19. A non-transitory machine-readable storage medium comprising instructions that, when executed by a processor, cause the processor to:
instantiate an automated agent on a computing device;
receive, by the automated agent, a plurality of messages from a plurality of users within a first time period;
determine, by the automated agent, a level of demand within the first time period for each of a plurality of content topics based on the plurality of messages,
wherein determining the level of demand for each of the plurality of content topics comprises mapping each of the plurality of messages to one of the plurality of content topics, wherein mapping each of the plurality of messages to one of the plurality of content topics comprises, for each of the messages:
  determining a plurality of candidate symptoms related to the message;
  transmitting the message and the plurality of candidate symptoms to a human agent; and
  receiving a selection of one of the plurality of candidate symptoms from the human agent,
wherein mapping each of the plurality of messages to one or more of the plurality of content topics further comprises, for each of the messages and the candidate symptom selected for the respective message:
  determining a plurality of candidate entities related to the message and the selected candidate symptom;
  transmitting the message and the plurality of candidate entities to the human agent; and
  receiving a selection of one of the plurality of candidate entities from the human agent, determine, by the automated agent, an availability of articles for each of the plurality of content topics;

determine, by the automated agent, one or more content topics from the plurality of content topics for which the level of demand for the respective content topic is not sufficiently met by the availability of articles for the respective content topic; and transmit, by the automated agent, a request to a content creator, the request requesting the content creator create or share content associated with the one or more content topics for which the level of demand is not sufficiently met by the availability of articles.

20. The non-transitory machine-readable storage medium of claim 19, wherein the level of demand for a first one of the plurality of content topics is determined based on a total number of messages from the plurality of requests that are related to the first content topic.

* * * * *